US012704410B2

(12) United States Patent
Lee

(10) Patent No.: US 12,704,410 B2
(45) Date of Patent: Aug. 11, 2026

(54) LASER DETECTOR

(71) Applicant: Fenix Research Corporation, Palo Alto, CA (US)

(72) Inventor: Yong Jin Lee, Palo Alto, CA (US)

(73) Assignee: Fenix Research Corporation, Palo Alto, CA (US)

( * ) Notice: Subject to any disclaimer, the term of this patent is extended or adjusted under 35 U.S.C. 154(b) by 58 days.

(21) Appl. No.: 18/990,559

(22) Filed: Dec. 20, 2024

(65) Prior Publication Data

US 2025/0244173 A1 Jul. 31, 2025

Related U.S. Application Data

(60) Provisional application No. 63/625,468, filed on Jan. 26, 2024, provisional application No. 63/625,465, filed on Jan. 26, 2024.

(51) Int. Cl.
*G01J 3/30* (2006.01)
*G01J 1/42* (2006.01)

(52) U.S. Cl.
CPC ............... *G01J 3/30* (2013.01); *G01J 1/4257* (2013.01)

(58) Field of Classification Search
CPC ................................. G01J 3/30; G01J 1/4257
See application file for complete search history.

(56) References Cited

U.S. PATENT DOCUMENTS 5,521,374 A 5/1996 Cray
6,792,028 B2 9/2004 Cook et al.
2007/0296970 A1 12/2007 Crow et al.
2008/0198371 A1 8/2008 Widen
2012/0087542 A1 * 4/2012 Schertler .............. G01S 7/4804 382/103
2012/0314210 A1 12/2012 Wick, Jr.
2015/0331082 A1 11/2015 Zollars et al.
(Continued)

FOREIGN PATENT DOCUMENTS

CN 111037126 A 4/2020
DE 19851010 B4 10/2010
(Continued)

OTHER PUBLICATIONS

U.S. Appl. No. 18/889,770, filed Sep. 19, 2024.
(Continued)

*Primary Examiner* — Jamil Ahmed
(74) *Attorney, Agent, or Firm* — Pearl Cohen Zedek Latzer Baratz LLP

(57) ABSTRACT

A system and method are provided for characterizing a laser using a diffraction grating. The system includes a lens that projects diffraction patterns from the diffraction grating as an image of diffraction peaks onto a plane. Optical sensors then sense the diffraction peaks. A processor connected to the optical sensors applies the laser characterization method to determine the laser wavelength, irradiance and angle of incidence. In the method, the processor obtains the diffraction peak measurements from the optical sensors and applies a transform to arrange the diffraction peaks into a grid of regularly spaced peaks. The processor then applies convolution kernels to analyze the grid of regularized peaks to determine a wavelength, irradiance and angle of incidence of the laser.

22 Claims, 25 Drawing Sheets

(56) References Cited

U.S. PATENT DOCUMENTS

| | | | |
|---|---|---|---|
| 2017/0269154 | A1 | 9/2017 | Torres |
| 2022/0026339 | A1 | 1/2022 | Nguyen |
| 2022/0170783 | A1 | 6/2022 | Kowarz |
| 2023/0296432 | A1 | 9/2023 | Kowarz |

FOREIGN PATENT DOCUMENTS

| | | | |
|---|---|---|---|
| RU | 2594953 | C2 | 8/2016 |
| WO | WO2010/054977 | A1 | 5/2010 |

OTHER PUBLICATIONS

U.S. Appl. No. 18/990,579, filed Dec. 20, 2024.

Response to Communication Pursuant to Rules 69 and 70a(1) EPC dated Jan. 23, 2026, European Patent Application No. 25152882.4.

Response to Communication Pursuant to Rules 69 and 70a(1) EPC dated Jan. 20, 2026, European Patent Application No. 25152908.7.

Response to Communication Pursuant to Rules 69 and 70a(1) EPC dated Jan. 27, 2026, European Patent Application No. 25152812.1.

Extended European Search Report dated Jun. 17, 2025, European Patent Application No. 25152882.4.

Extended European Search Report dated Jun. 17, 2025, European Patent Application No. 25152908.7.

Extended European Search Report dated Jun. 30, 2025, European Patent Application No. 25152812.1.

Notice of Allowance dated Apr. 3, 2026, U.S. Appl. No. 18/889,770 filed Sep. 19, 2024.

Non-final Office Action dated Apr. 22, 2026, U.S. Appl. No. 18/990,579, filed Dec. 20, 2024.

* cited by examiner

Additional steps to FIG. 12 for an embodiment to further determine a position of the laser source.
1702
Determining a location of the laser source relative to a laser detector system containing the diffraction grating by using the angle of incidence, a global navigation satellite system (GNSS) and inertial navigation system (INS) position system, and a ground map resource

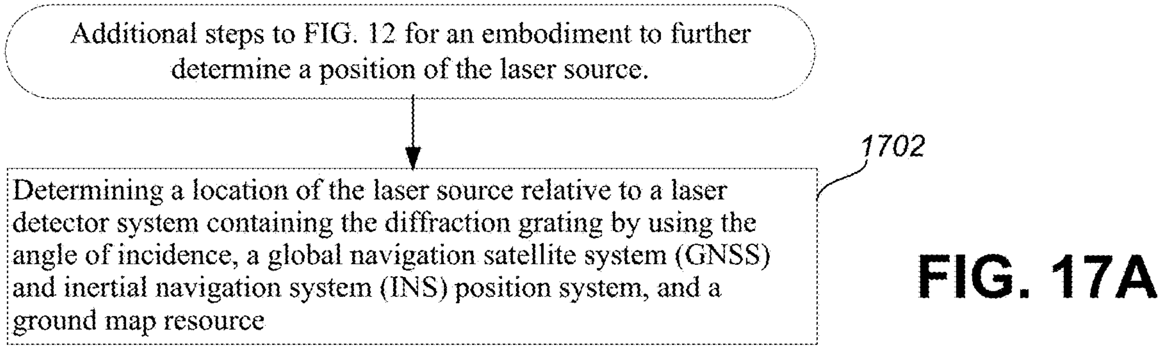

FIG. 17A
Additional steps to FIG. 16 for an embodiment using an offset axis to further determine a position of the laser source.
1710
Measuring an offset axis of the plane containing the optical sensors relative to a plane perpendicular to the central axis of the laser beam using a tilt, pan and roll indicator.

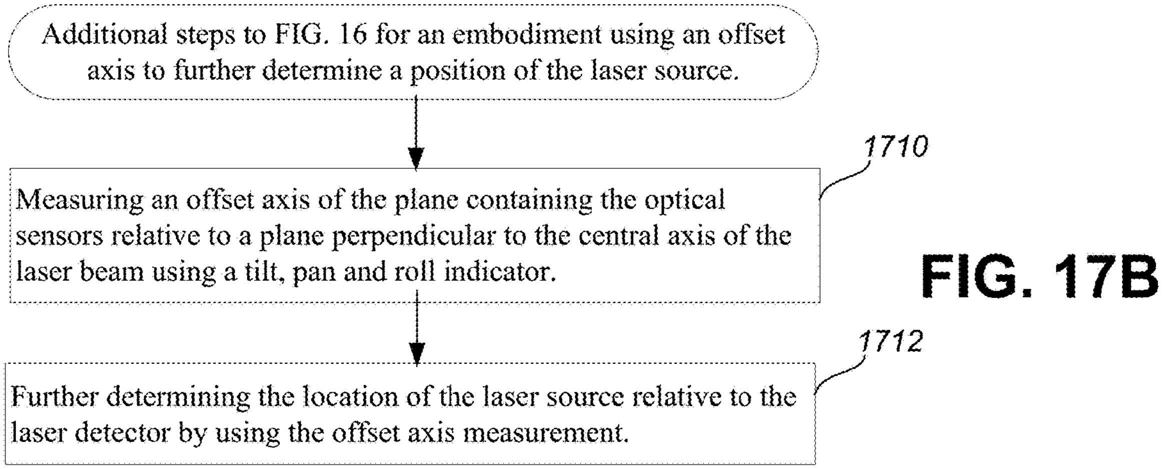

FIG. 17B
1712
Further determining the location of the laser source relative to the laser detector by using the offset axis measurement.
Additional steps to FIG. 16 for an embodiment to further determine a position of the central peak in the grid of regularized peaks when saturation regions occur in detected image peaks.

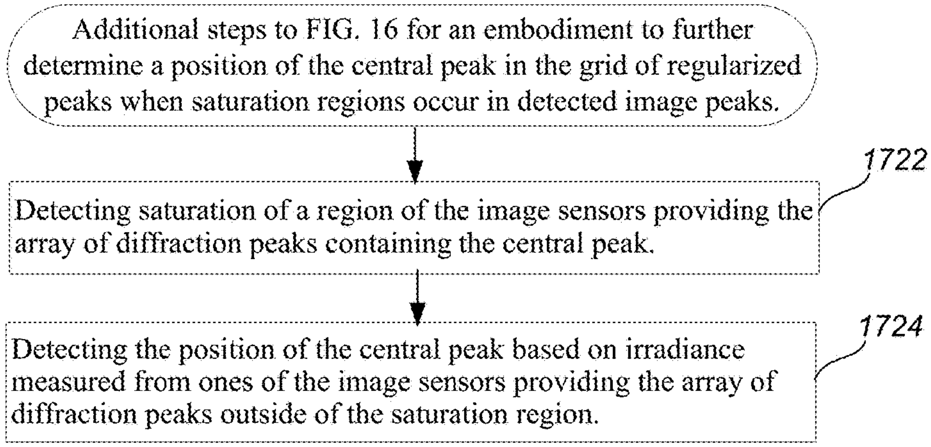

FIG. 17C
1722
Detecting saturation of a region of the image sensors providing the array of diffraction peaks containing the central peak.
1724
Detecting the position of the central peak based on irradiance measured from ones of the image sensors providing the array of diffraction peaks outside of the saturation region.

LASER DETECTOR

CLAIM FOR PRIORITY

This application claims priority to U.S. Provisional Application No. 63/625,468, filed on Jan. 26, 2024 titled "Laser Power Detection" and U.S. Provisional Application No. 63/625,465, filed on Jan. 26, 2024 titled "Laser Detector," the contents of both provisional applications are incorporated by reference herein in their entirety.

FIELD

Embodiments of the present technology generally relate to detection of a laser, and more specifically relate to detection of characteristics and location of the laser.

BACKGROUND

Laser detectors have been provided to determine when a laser is being used to target a pilot in an aircraft. The laser detector notifies the user of the existence of such a laser source. A laser beam strike can cause temporary or even permanent blindness of the pilot. Accurate and fast detection of such a laser using a laser detector that is provided in the aircraft to alert the pilot is desirable. It is also desirable to determine characteristics, including wavelength and irradiance, and location of the laser source to help find the laser and its operator. Identifying and locating the laser as quickly as possible enables authorities to find the laser source and prevent further attempts to cause harm to pilots. Laser detectors can also be used to identify laser designators and optical range finders, allowing an aircraft crew to take evasive action and address potential threats.

SUMMARY

Embodiments described herein provide a system and method for characterizing a laser using a diffraction grating. The system includes a lens that projects diffraction patterns from the diffraction grating as an image of diffraction peaks onto a plane. Optical sensors then sense the diffraction peaks. A processor connected to the optical sensors applies the laser characterization method to determine the laser wavelength and irradiance. In the method, the processor obtains the diffraction peak measurements from the optical sensors and applies a transform to arrange the diffraction peaks into a grid of regularly spaced peaks. The processor then applies convolution kernels to analyze the grid of regularized peaks to determine a wavelength and irradiance of the laser.

In certain embodiments, the grid of regularized peaks comprises a square grid of peaks. Applying the convolution kernels to analyze the grid of regularized peaks then comprises determining a distance between peaks of the square grid of peaks. The distance between peaks is used to determine a wavelength of the laser beam and the profile of the peak intensities are used to determine the laser irradiance.

In certain embodiments, the grid of regularized peaks comprises a distinct pattern of peaks that is analyzed by the convolution kernels to determine the wavelength and irradiance by spatially filtering the image and then applying a series of two-dimensional Shah functions.

In certain embodiments, the laser wavelength is determined by convolving a series of kernels corresponding to the pitch of the regularized peaks and evaluating a resulting convolved image to determine a kernel that produced a best fit with the grid of regularized peaks.

In certain embodiments, the laser beam is characterized by performing analysis on progressively higher resolution images and using convolution kernels optimized for each of the sequences of images. Initially ones of the convolution kernels are used to determine if initial ones of the grids have a pattern of regularized peaks that are of high enough resolution to identify the laser. Then subsequent ones of the convolution kernels are used to determine a higher resolution distance between peaks of the grids of regularized peaks to identify the wavelength and irradiance for the laser.

In certain embodiments, the array of diffraction peaks includes distinct patterns with varying pitches when multiple lasers are present corresponding to a specific wavelengths corresponding to the multiple lasers that is detectable by the convolution kernels. The convolution kernel then determines the wavelength of the laser beam as well as a wavelength of additional ones of the multiple lasers within the specific wavelengths. The irradiance for each wavelength is determined from the intensity profile of the peaks corresponding to the wavelength.

In certain embodiments, the image is processed to highlight patterns of the regularly spaced diffraction peaks characteristic of a laser and to suppress regions from a nonlaser source which do not have well defined diffraction peaks.

In certain embodiments, the array of diffraction peaks is a two dimensional array of diffraction peaks that are converted to horizontal and vertical one-dimensional signals. The convolution kernels in these embodiments process the signals resulting from at least one of the horizontal and vertical one-dimensional signals to determine spacing between peaks to identify wavelength and intensity profile to determine irradiance. In some of these embodiments, the horizontal one dimensional signals constitute row signals and the vertical one dimensional signals constitute column signals, and the convolution kernel processes the row signals and column signals by using a summation of the intensities.

In certain embodiments the optical lens of the system is an orthographic projection lens that follows the sine law that natively generates diffraction peaks in a square grid. In further embodiments, the optical lens comprises a first optical lens as well as a second optical lens, wherein the diffraction grating is placed between the first optical lens and the second optical lens forming a lens assembly.

In certain embodiments, the optical sensors of the system include secondary sensors and primary sensors. The secondary sensors are used for screening signals received from the optical sensors to identify the laser beam relative to nonlasers. The primary sensors have higher power consumption and higher resolution than the secondary sensors and are used by the convolution kernels to determine the wavelength of the laser beam.

In certain embodiments, the diffraction grating of the system comprises a combination of two or more linear diffraction gratings placed at specific angles with respect to each other. In one embodiment the two or more linear diffraction gratings comprise two diffraction gratings and the specific angles are 90 degrees with respect to each other. In an alternative embodiment, the two or more linear diffraction gratings comprise three diffraction gratings and the specific angles are 60 degrees with respect to each other. The diffraction element can also be a component with two dimensional patterns.

Embodiments described herein further provide a system and method for determining the location of a laser source.

The system uses a diffraction grating that receives the laser beam strike to determine the location. Optical sensors sense an array of diffraction peaks from the image output from the diffraction grating. A processor connected to the optical sensors is configured to obtain the diffraction peaks from the laser beam strike and apply a transform to arrange the diffraction peaks into a grid of regularized peaks. A convolution kernel is then applied by the processor to determine a position of the zeroth order diffraction central peak in the grid of regularized peaks. The position of the central peak is then used to calculate the angle of incidence of the axis of the laser beam to determine the location of the laser.

Certain embodiments of a system for determining location of the laser further include: a global navigation satellite system (GNSS) and inertial navigation system (INS) position system sensors; a ground terrain map resource; and a tilt, pan and roll angle indicator that indicates a tilt, pan and roll angles of a plane containing the optical sensors of the laser detector. The processor uses the diffraction grating to determine the angle of incidence of the laser beam relative to laser detector. The processor further uses the tilt, pan and roll angles of optical sensors relative to reference coordinates including: offset axis of the plane containing the optical sensors relative to a plane perpendicular to the central axis of the laser beam; and orientation of the vehicle the laser detector is attached to, so as to make a determination of a look angle of the laser detector. A location and orientation of the laser detector is further determined using the GNSS-INS position system sensors. Location of the laser source based on terrain information is obtained from the ground map resource.

In certain embodiments, the processor is configured to make measurements even when some of the image sensors are in saturation. In these embodiments, when saturation of a region of the image sensors is detected, the position of the central peak is determined based on irradiance measured from ones of the image sensors providing the array of diffraction peaks that are outside of the saturation region. The intensity profile of the peaks in the central saturated region is computed from diffraction theory, for example, through the use of Fraunhofer equations.

In certain embodiments when saturation is detected, the processor determines the central zeroth order peak position by adding the columns and rows of the partially saturated diffraction image, where the central peak is determined by the sum of saturated region and unsaturated regions contained in the rows or columns. The saturation region provides a broad bump, while unsaturated diffraction peaks provide sharper peaks in a one dimensional pattern provided from the rows and columns. The profile of the broad bump and the peaks over the bump are used to compute the location of the central peak, the pitch between peaks, and the intensity profile of the peaks.

Certain embodiments provide for detection of multiple laser sources operating at different wavelengths. In such embodiments, a convolution kernel is used to identify the separate laser sources based on different wavelengths determined from the grid of regularized peaks. The convolution kernels then determine a position of the zeroth order diffraction central peak in the grid of regularized peaks for each separate laser. The position of the central peak for each laser source is then used to calculate the angle of incidence of the axis of the respective laser source to enable determination of the location of each laser.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 17A is a flow diagram that shows further steps to those in FIG. 16 to determine the position of a laser source relative to a laser detector system including use of a global navigation satellite system (GNSS) and inertial navigation system (INS) position system, and a ground map resource.

FIG. 17B is a flow diagram that shows further steps to those in FIG. 16 to determine position of a laser source relative to a laser detector system including measurement of an offset axis of the image plane containing the optical sensors relative to a plane perpendicular to the central axis of the laser beam including use of a tilt, pan and roll indicator.

FIG. 17C is a flow diagram that shows further steps to those in FIG. 16 for an embodiment to further determine a position of the central peak in the grid of regularized peaks when saturation regions occur in detected image peaks.

DETAILED DESCRIPTION

Embodiments described herein provide a laser detector with an efficient use of components to characterize a laser source as well as determine the location of the laser. In certain embodiments, the laser detector components include a diffraction grating to enable determination of wavelength, irradiance and location of a laser source. Such characterization and location information using a laser detector according to embodiments enables efficient location of a laser used to target the pilot of a vehicle or aircraft.

The diffraction grating used in the laser detector according to embodiments provides an image of diffraction peaks onto a plane in the laser detector where optical sensors sense the diffraction peaks. A processor then obtains the diffraction peak measurements from the optical sensors and applies a transform to arrange the diffraction peaks into a grid of regularly spaced peaks. The processor then applies convolution kernels to analyze the grid of regularized peaks to determine a wavelength of the laser and the intensity profile of the peaks to determine the irradiance The convolution kernels can also be applied to the sensed regular grid of diffraction peaks to determine a position of zeroth order diffraction central peak. The position of the zeroth order diffraction central peak is then used to calculate the angle of incidence of the axis of the laser beam relative to the center of the laser detector to enable determination of the location of the laser.

Figure 1:
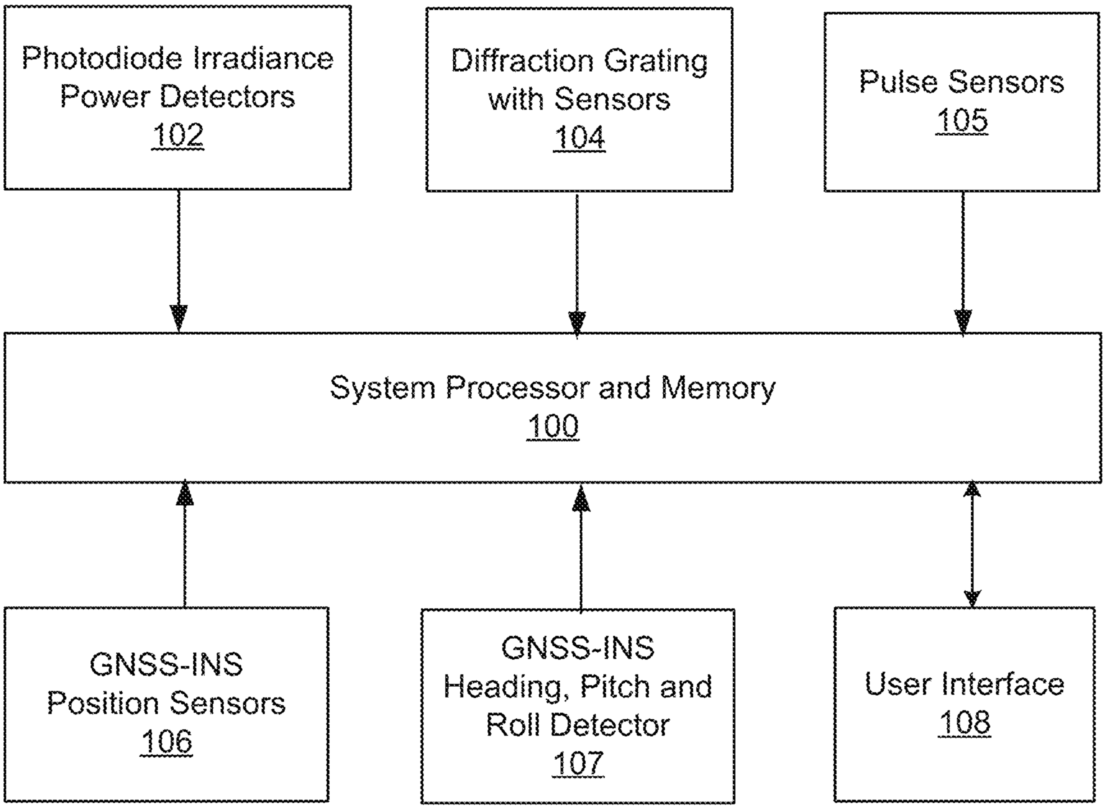
FIG. 1 is a high level block diagram of a system for detecting a laser source according to embodiments.

FIG. 1 is a high level block diagram of a system for characterizing and locating a laser according to embodiments described herein. The system includes a system processor and memory 100 which serves as the system control unit. The system further includes photodiode irradiance power sensors 102 to detect power from a laser beam, the photodiode irradiance power sensors providing output signals to the system processor and memory 100. Further, to determine the position of the laser source relative to the photodiode irradiance power sensors and to characterize the source as a laser, the system includes a diffraction grating with sensors 104 that provides output signals to the system processor and memory 100. In addition to the diffraction grating with sensors 104, to determine if a light source detected is a laser as opposed to a non-laser source, a pulse sensor 105 is further included. To further determine position of the system itself relative to the laser source to enable calculation of laser beam power, the system includes global navigation satellite system (GNSS) and inertial navigation system (INS) position system sensors 106 that provide signals to the system processor and memory 100. When mounted on an aircraft, the GNSS-INS system 106 provides the aircraft latitude, longitude, elevation and attitude. This set of information can be used to compute the location of the laser source relative to the laser detector containing the components of the system of FIG. 1, as well as the absolute location, in latitude and longitude, of the laser. To further compute the position of the laser source, a GNSS-INS heading, pitch and roll detector 107 is included that provides any offset of the laser detector relative to the laser source due to a tilt angle of the laser detector. Finally, the system includes a user interface 108 that is connected to the system sensors 106 to enable a user to receive warnings about laser strikes as well as to request and receive further information about a laser source. Examples of the user interface 108 include a display screen, keypad or keyboard, and touch-screen or mouse interface. The user interface 108 can be provided separate from the laser detector and connected through a wireless interface to send and receive data from the laser detector.

In embodiments described herein the user interface 108 provides information about the characteristics and location of a laser source to the user on a display so that the user can identify a harmful laser source. The user can be an aircraft pilot, an operator of a ground-based vehicle or an individual who is not using a vehicle that is using the detector to identify a laser source that could be harmful to the operator. The user interface 108 can provide an audio alert when the beam strike occurs to enable the operator to identify the existence of the laser and respond to neutralize the threat. The laser characteristics and location can also be displayed to let the pilot or vehicle operator more quickly identify and locate the detected laser source. Other characteristics of the laser can be displayed to the user to enable the user to determine other characteristics such as power level so that the pilot can quickly take steps to avoid eye damage.

The user interface screen in embodiments can display characteristics such as laser wavelength, exposure irradiance, and exposure duration. Additionally, the screen can provide a map marker that indicates the laser location. Other information such as the time, laser detector host aircraft location and altitude can also be provided for viewing on the screen. In embodiments, the user can navigate to the map and settings screens using navigational icons on the screen.

The user in embodiments can also toggle between scenery and map views in real time while a laser is being tracked. The map view provides the location of the aircraft and the laser source. The map view can also provide information on the laser. In embodiments, the user can use standard multi-touch gestures to adjust the map view (e.g., zoom in/out). Scenery view is similar to a map view, but with scenery included to help the viewer locate the laser source.

In embodiments, caution and warning indicators can be provided. The caution indication signals that there is a laser threat in the area but not a laser strike. The indicator can be provided in color such as yellow as a warning indicator. The warning indication includes indication of a laser strike. Warning icons and text in embodiments can be presented in red. The display can be made night vision goggle (NVG) compatible, and both the yellow and red pixels for LCD and OLED displays can be visible through NVG.

The user interface 108 can further operate with a transmitter to transmit the laser characteristics and location to the authorities separate from an operator using the laser detector. With such a transmitter, authorities can be quickly alerted about a laser source being detected along with location and other information to detect the laser source immediately provided to the authorities who can take steps to eliminate the danger. Information such as laser wavelength and location of the laser source can help authorities identify the particular laser which can enable them to determine who might be operating the laser to enable location of the person using the laser along with position information provided from the laser detector.

Figure 2:
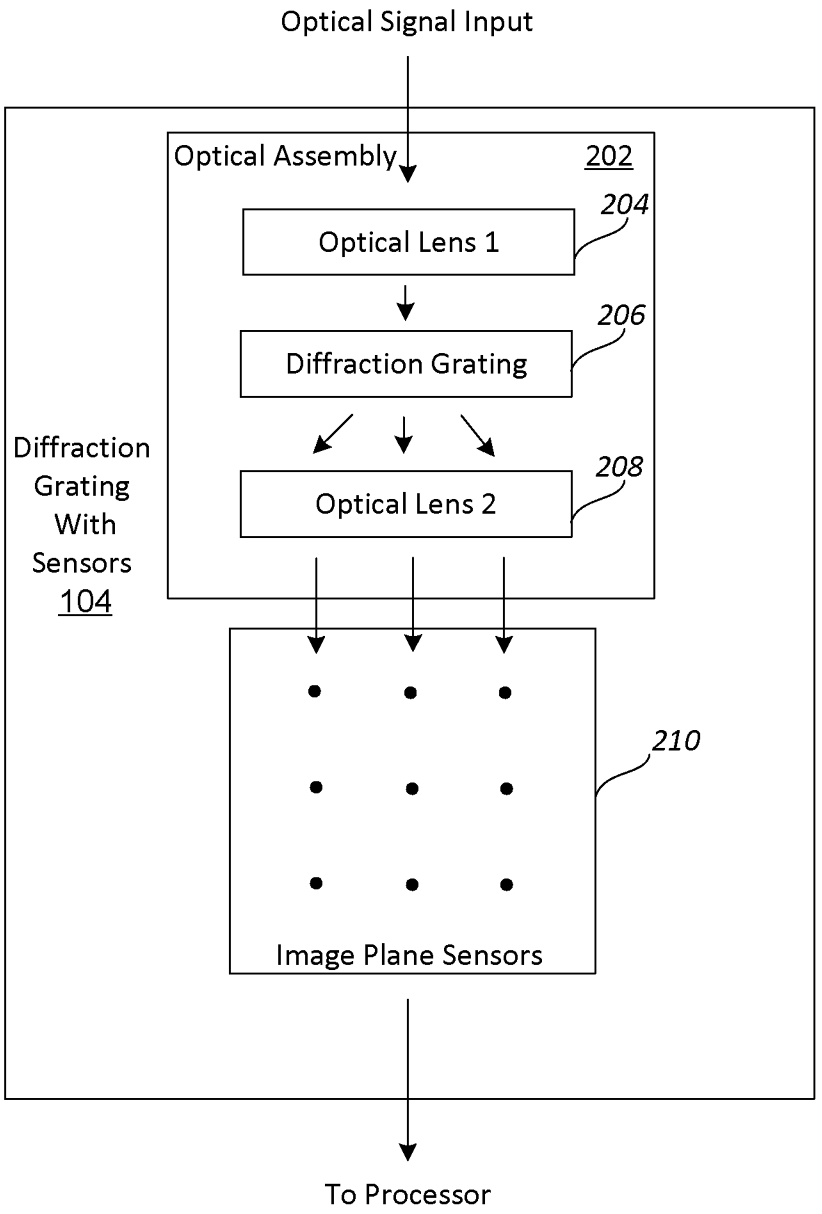
FIG. 2 is an illustration of a diffraction grating with sensors of the system of FIG. 1 including a diffraction grating provided between optical lenses that project a laser beam image onto optical sensors.

FIG. 2 is an illustration of an embodiment of a diffraction grating with sensors 104 of the system of FIG. 1. The embodiment includes an optical assembly 202 with a diffraction grating 206 provided between optical lenses 204 and 208 that project a laser beam onto an image plane with optical sensors 210. The diffraction grating 206 and pair of optical lens 204 and 208 project a regular array of diffraction spectral peaks onto image plane sensors 210 when a laser beam is received. The signals from the image plane sensors 210 of FIG. 2 are provided to a processor and memory system 100 as shown in FIG. 1.

In an alternative embodiment to that shown in FIG. 2, only a single lens such as lens 204 is provided behind the diffraction grating 206. Further, the optical lens can be a wide field of view (FOV) lens, such as a camera lens. In some cases, the lenses 204 and 208 introduce distortion near the edges and corners that are resolved with a transformation matrix that is discussed subsequently herein. In one example embodiment, the lenses 204 and 208 are 120 degree FOV wide angle lenses.

Figure 3:
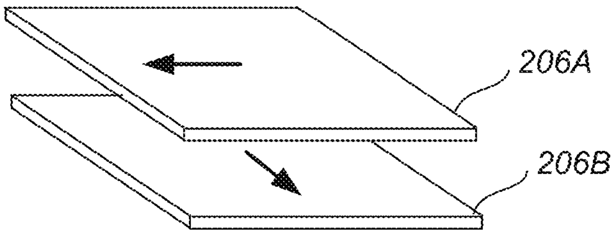
FIG. 3 is an illustration of a diffraction grating made up of a combination of two linear diffraction gratings having specific angles of 90 degrees with respect to each other.

FIG. 3 is an illustration of a diffraction grating 206 of FIG. 2 in one embodiment which is made up of a combination of two linear diffraction gratings 206A and 206B with diffraction gratings placed at specific angles with respect to each other. In the embodiment shown in FIG. 2, the diffraction gratings 206A and 206B are shown having specific angles of 90 degrees with respect to each other. In an alternative embodiment, the diffraction gratings can be placed at specific angles of 60 degrees with respect to each other. Other specific angles can be used as would be understood by a person of ordinary skill in accordance with embodiments. Alternatively, the diffraction element can be designed as an integrated single element with two dimensional patterns designed to create the desired diffraction pattern. The system, thus, provides dual-axis optical diffraction to characterize and locate a laser source.

Figure 4:
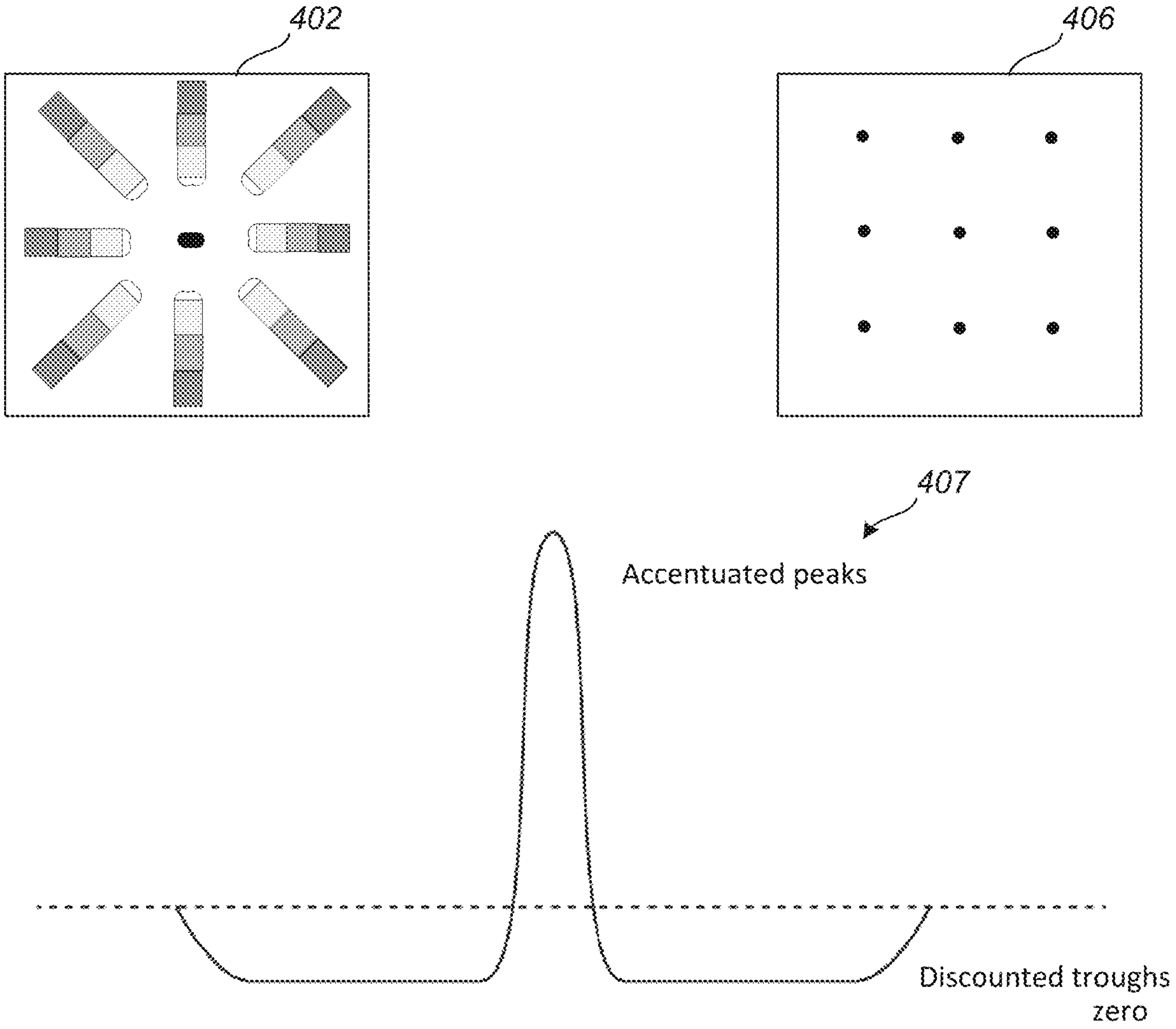
FIG. 4 is an illustration of diffraction patterns from non-laser and laser sources and a cross section of a convolution kernel used to distinguish between them.

FIG. 4 is an illustration of diffraction patterns from an incoherent source 402 and a laser 406 and a cross section of a convolution kernel 407 used to distinguish them. Convolution kernel specifically designed to accentuate diffraction peaks from a laser and to discount the radiating troughs of diffraction patterns from a non-lasers can be used. The convolution kernel has a central peak corresponding to the central diffraction point and troughs radiating out of the center corresponding to the spread-out spectra of the non-laser source. A cross section of the kernel is shown in 407. Convolution of this kernel with a diffraction pattern from a non-laser source 402 will result in a convolution image without strong intensity since the positive peak in the central region will be compensated by the negative troughs. Convolution with a diffraction peak from a laser 406 will produce a large intensity since the central peak is not compensated by the presence of spread out troughs.

In more detail, the cross-correlation algorithm or convolution kernels start with the generation of the reference kernels. An optimized pattern (e.g., Laplacian of Gaussian profile) is used to convolve a pattern with a matrix of delta functions arranged into a grid (e.g., a 2-D Shah function). In the regularized peaks 406 shown in FIG. 4, a 3 by 3 grid is provided. The result of the convolution between a unit profile (e.g. Laplacian of Gaussian) and the 3 by 3 bed of nails function results in the replication of the profile into the grid.

Once a diffraction image is obtained it is first corrected for distortions to provide a rectilinear, evenly spaced diffraction pattern. This is based on first taking system identification diffraction pattern measurements during an initial calibration procedure. To calibrate, a set of calibrated reference lasers are directed into the diffraction camera. An algorithm then creates a transformation matrix to convert the distorted pattern into a regularized pattern. This transformation matrix is saved into the device and is used to correct for the distortions of the images later taken in the field. The distortion correction is particularly useful when using wide field of view lenses that provide significant lens distortions.

After distortion correction is applied, the cross-correlation algorithm performs an image edge-enhancement procedure to reduce the intensity of any broad-area bright fields. An edge-detection kernel is convolved with the image to optimize the removal of the bright fields. The edge-detection kernel is optimized based on the shape of the reference profile used in the diffraction detection kernel. The pre-processed image is then cross-correlated (convolved) with the kernel. The resulting cross correlation value is maximized when the reference kernel has the right pitch (laser wavelength) and corresponds to the correct position (laser location).

The cross-correlation algorithm can enhanced by also referencing the data obtained from the diffraction grating with sensors 104 with data obtained from the photodiode array and power sensors 102. The photodiode array and power sensors 102 uses an image from an array of photodiode sensors obtained separate from the diffraction grating and with sensors 104. The photodiode array and power sensors 102 further provides spectral information that can be used to narrow the search space of the cross-correlation algorithm. The search for the pitch of the reference key obtained from the diffraction grating with sensors 102 can be significantly minimized by a priori information of the wavelength content of the lasers in the field of view. The photodiode array and spectrometer can also be used to quickly discriminate against false positives. The spectral patterns of common sources of false alarms such as the sun, streetlamps, or muzzle flashes are broadband and has a characteristic shape. Spectroscopic data can be used to rule out false positives without loss of sensitivity.

The aperture function used for the laser detector can be constructed by first multiplying the shah (bed of nails) function with a circ function (representing a camera aperture of lenses 204 and 208 used in the system of FIG. 2), and subsequently convolving the product with rect function (representing a single pixel in the two-dimensional grating). Let $r_0$ be the aperture radius of the camera, (a, b) the spacings of the shah functions in the (x, y) directions, and (c, d) the spacings between the square grating feature in the (x, y) directions. The Fraunhofer diffraction field $U_2(x, y)$ of the aperture and grating can be expressed as:

$$U_2(x, y) = |\mathrm{cd}|P(x, y, z)\sum_{n=-\infty}^{\infty}\sum_{m=-\infty}^{\infty} r_0^2 jinc\left(r_0\sqrt{\left(\frac{x}{\lambda z}-\frac{n}{a}\right)^2+\left(\frac{y}{\lambda z}-\frac{m}{b}\right)^2}\right)$$
$$\mathrm{sin}c\left(\frac{cx}{\lambda z}\right)\mathrm{sin}c\left(\frac{dy}{\lambda z}\right)$$

Fourier transform pairs form key optical structures in the dual axis diffraction sensor analysis equation. With diffraction, a circle become a jinc function, and a rectangle becomes a product of sinc functions. A two-dimensional shah function remains a two-dimensional shah function but with a different pitch. Three Fourier transform pairs are used in the analysis. A first Fourier transform pair is applied to the initial image received from the diffraction grating providing the function $g_{in}$(x,y), with a transform $G_{in}$(u,v) to remove contaminants as follows:

$$g_{in}(x, y) = circ\left(\frac{\sqrt{x^2+y^2}}{r_0}\right)$$
$$G_{in}(u, v) = r_0^2 jinc\left(x_0\sqrt{u^2+u^2}\right)g_{out}(x', y')\,\alpha\, jinc\left(\frac{2\pi r_0\sqrt{x'^2+y'^2}}{\lambda}\right)$$

A second Fourier transform is then applied to the first Fourier transform image output providing the function $g_{in}$ (x,y), with a transform $G_{in}$(u,v) to remove distortion and correct for movement as follows;

$$g_{in}(x, y) = rect\left(\frac{x}{x_0}\right)rect\left(\frac{y}{y_0}\right)$$
$$G_{in}(u, v) = x_0 y_0 \mathrm{sinc}(x_0 u)\mathrm{sinc}(y_0 v)g_{out}(x', y')\,\alpha\,\mathrm{sinc}\left(\frac{x_0 x'}{\lambda}\right)\mathrm{sin}\left(\frac{y_0 y'}{\lambda}\right)$$

A third Fourier transform is applied to the second Fourier transform image output providing the function $g_{in}$(x,y) with a transform $G_{in}$(u, v) to provide a final refined set of refraction peaks identified with the laser source as follows:

$$g_{in}(x, y) = III\left(\frac{x}{x_0}, \frac{y}{y_0}\right)$$
$$G_{in}(u, v) = x_0 y_0 III(x_0 u, x_0 u)g_{out}(x', y')\alpha\, III\left(\frac{x_0 x'}{\lambda}, \frac{y_0 y'}{\lambda}\right)$$

A key element of the diffraction pattern analysis prior to applying the cross-correlation algorithm is optimizing the diffraction sensor exposure control setting. While the larger exposure settings are better for viewing by human beings, the lower settings are better optimized to provide peaks for interpretation by the algorithm. The lower exposure settings, although not visible to the human eye, with fine tuning adjustment results in a well-defined diffraction pattern plot.

The first step in the dual-axis diffraction image processing using the cross-correlation image function is correction for lens distortion. This is particularly important for wide field of view (FOV) lenses that have significant lens distortions near the edges and corners. The algorithm takes the local maxima of the diffraction patterns and applies a transformation that provides a rectilinear, consistent pitch in both the x and y directions. The initial computation of the transformation matrix is performed offline using reference lasers. The transformation that produces equally spaced rectilinear patterns is customized for each device (lens, diffraction grating and camera combination). An automated algorithm computes the transformation matrix and stores it for use in the field. Upon applying the correction, the diffraction pattern is rectilinear and equally pitched.

In a next step for the convolution kernel generation algorithm, a reference key is used to detect the wavelength and position of the laser in the 2-D diffraction pattern as described to follow. First, a profile that matches the local maximum region of the diffraction pattern is generated. The optimized profile does not fit the diffraction pattern exactly but is designed to be slightly larger to allow slight misregistration between the reference key and the diffraction pattern.

The profile provided is a 2-D symmetric Gaussian function that generates a set of reference peaks such as those shown in image 406 of FIG. 4. For generating the function, the optimized single peak profile is replicated into the regularly spaced pitch pattern by convolving the profile with the truncated bed of nails function shown in image 406. Upon convolving the single peak profile with the 3×3 bed of nails function, an optimized 3×3 pattern with the original single peak profile replicated nine times (3×3) is generated. Larger shapes, such as 5×5 or 7×7 can also be used.

The profile of a reference key used by the convolution kernels to distinguish lasers from incoherent light can be optimized to actively reject known patterns associated with false positives while accepting the patterns associated with lasers. The image 402 of FIG. 4 shows the characteristically different diffraction patterns generated by an incoherent source characterized by a central peak with broad spectral lines radiating out from the center. In comparison, diffraction patterns resulting from coherent sources will not have the broad spectral lines The reference key can be continually optimized to better enable distinguishing between incoherent and coherent light sources.

In one method of actively accepting positive patterns generated by coherence sources while rejecting false patterns generated by incoherent sources, a central peak pattern is designed to accept the characteristically symmetric and tall amplitude pattern generated by coherence sources. The troughs radiating out in the x and y directions as shown in the graph 407 of FIG. 4 are designed to explicitly discount the broad patterns generated by incoherence sources. The optimized reference key pattern is then replicated into a grid by convolving the profile with the 3×3 bed of nails function.

In a next step, the cross-correlation algorithm applies a function to correct for lens distortion. For the camera lenses surrounding a diffraction grating, there is typically a noticeable pincushion distortion at the edges of the image. The algorithm removes the distortion from the image using a predefined rectilinearization transformation matrix obtained during calibration. Alternatively, an orthographic projection lens following the sine law can be used to create natively rectilinear diffraction patterns that require minor distortion correction. In the algorithm, a reference key generated during the calibration is used to perform a series of cross-correlations on the diffraction image. The pitch of the reference key is adjusted until the best-fit cross-correlation is obtained. The search space for the pitch is reduced if the wavelength information is available from the photodiode array or the spectrometer. The result is a best-fit cross-correlation that produces the largest peak amplitude. The determination of the best fit pitch also provides information on the wavelength of the target laser. The amplitude of the pre-convolution and post convolution image provides information on the irradiance.

Regarding determination of location position, discussed subsequently the cross correlation algorithm used to determine wavelength and irradiance also provides for detection of a maximum point in regularized peaks and provides the corresponding to the zeroth order diffraction peak position and the corresponding x-y coordinate in the image sensor. The amplitude of the maximum point as well as analysis of the pre-convolution image is used to compute the detected irradiance of the laser strike. The position on the cross-correlation plot corresponding to the maximum point indicates the position of the laser. As described in detail in the location computation section subsequently, the x-y coordinate of the laser in the image is converted to the location on a map.

The effect of optical flow or motion is further taken into account by the cross-correlation algorithm when analyzing diffraction patterns with optical flow within a frame. Optical flow is the motion of objects between consecutive image frames caused by the relative movement between the object and a camera lens. By estimating optical flow between video frames, velocities of objects in the video can be measured. In general, moving objects that are closer to the camera will display more apparent motion than distant objects that are moving at the same speed. The apparent optical flow of the diffraction patterns, however, is the same with distant and close objects.

For the cross-correlation algorithm used to account for optical flow, the 3-D path of a point projects onto a 2-D path of the image plane. The 2-D path received by the image sensors will have x and y coordinates, while the movement over time of the image plane sensors will provide a z coordinate. The optical flow can be a pure translation with linear movement, a pure rotation with angular movement over time, or a combination of translation and rotation. If $[X_0, Y_0, Z_0]$ and $[X_1, Y_1, Z_1]$ are the world coordinates at times to and ti, the change in camera lens coordinates satisfy the following equations:

$$\Delta x = f\frac{X_1}{Z_1} - f\frac{X_0}{Z_0} = fX_0\frac{vt}{(Z_0 - vt)Z_0}$$

$$\Delta y = f\frac{Y_1}{Z_1} - f\frac{Y_0}{Z_0} = fY_0\frac{vt}{(Z_0 - vt)Z_0}$$

Figure 5:
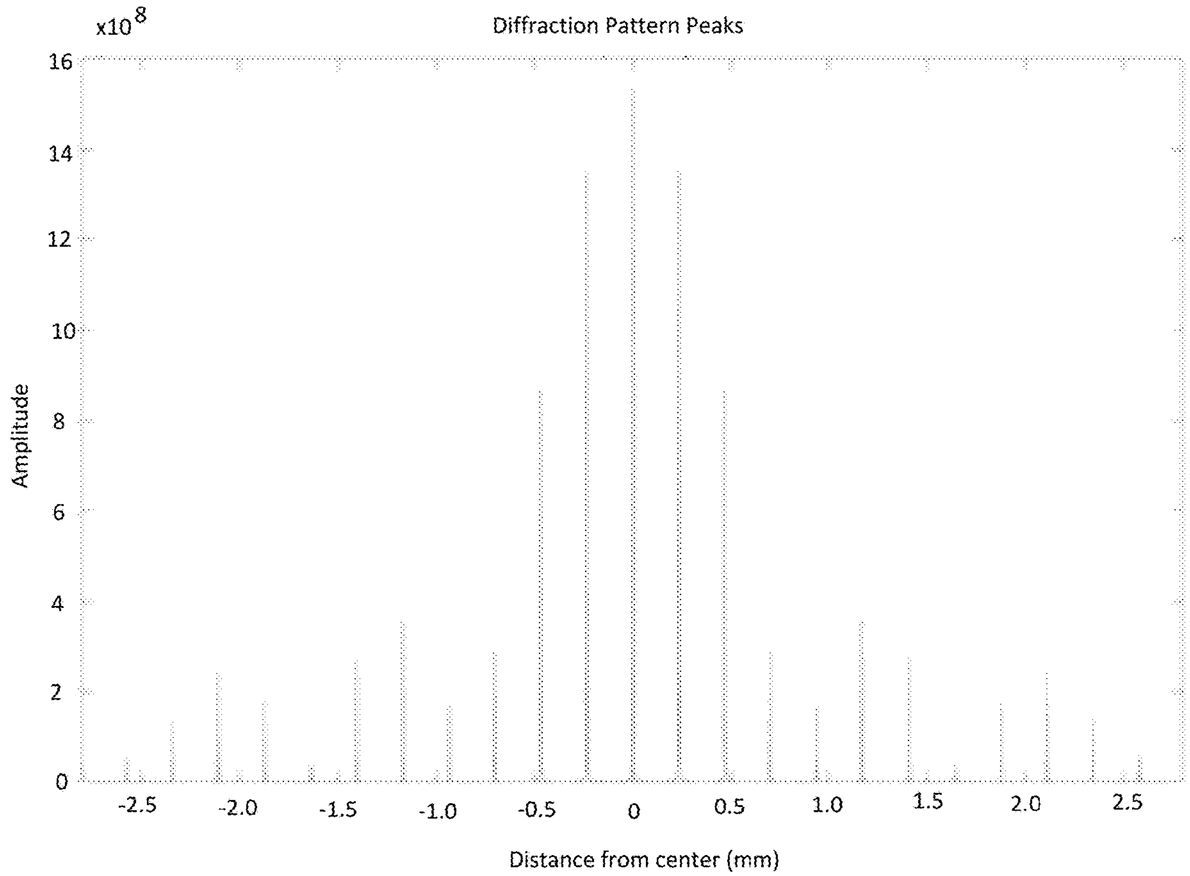
FIG. 5 is a two-dimensional graph of diffraction pattern peaks showing peak amplitude versus distance from a central peak in the center of a grid of regularized peaks.

FIG. 5 is a two-dimensional graph of diffraction pattern peaks showing peak amplitude versus distance from a central peak in the center of a grid of regularized peaks. The x axis shows a distance of peaks from the central peak of the regularized peaks which has the highest amplitude, with the central peak being at the origin with a location of zero. The y axis is shows the amplitude of the peaks. The pitch of the peaks is used to compute the wavelength of the laser. The profile of the peak amplitudes is used to compute the irradiance of the laser.

Figure 6:
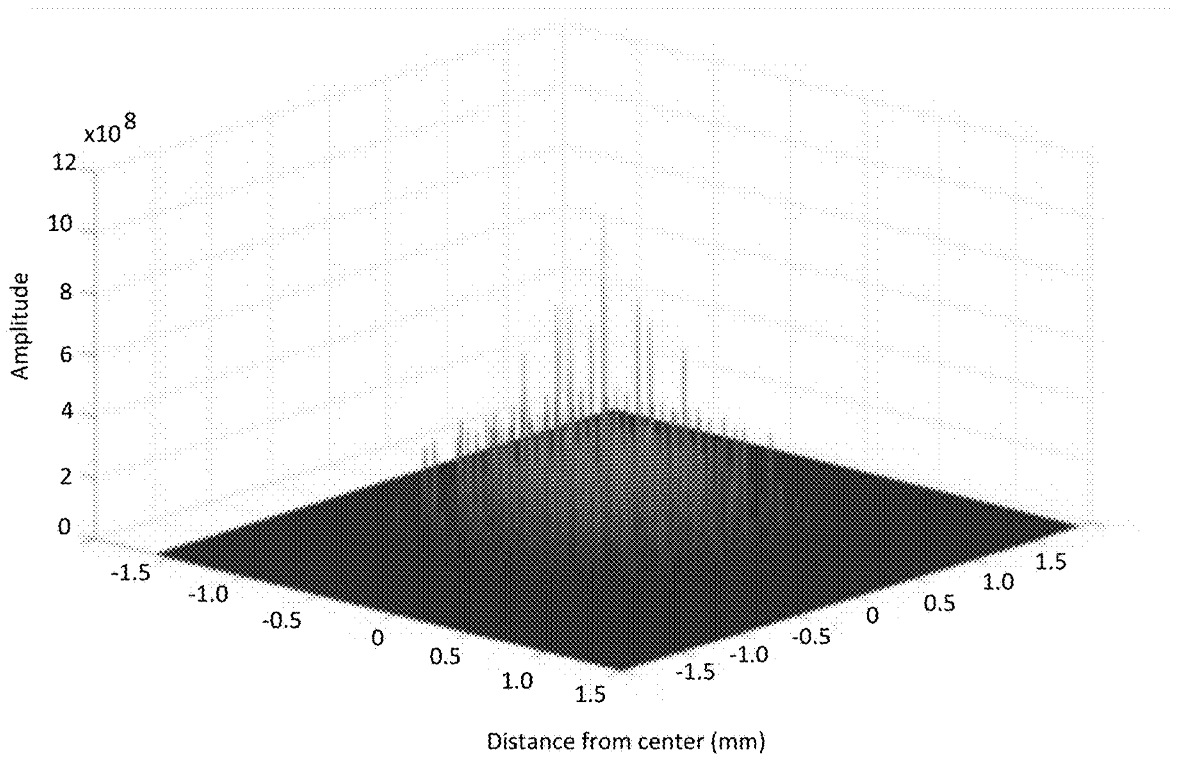
FIG. 6 is a three-dimensional graph of diffraction pattern peaks showing peak amplitude versus distance from a central peak in the center of a grid of regularized peaks along both an x and y axis.

FIG. 6 is a three-dimensional graph of the convolved diffraction pattern peaks showing peak amplitude in the z-axis versus distance from a central peak in the center of a grid of regularized peaks in the along both an x and y axis. The 3D graph of regularized peaks of FIG. 5 is obtained from the cross correlation or convolution kernels applied to the two dimensional diffraction pattern as described above. Again, the central peak has the highest amplitude and is placed at the origin with a location of zero in FIG. 6. In general, the position of highest peak is a function of the angle of incidence of the laser.

Figure 7:
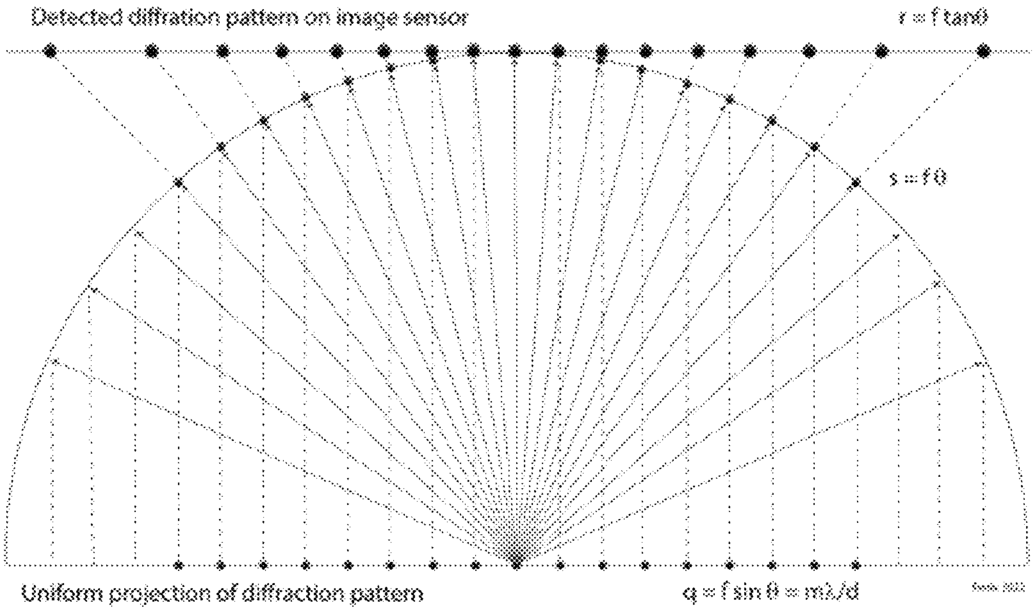
FIG. 7 shows a uniform projection of diffraction patterns from a diffraction grating onto an image plane at a fixed distance.

FIG. 7 shows a uniform projection of diffraction patterns from a diffraction grating onto an image plane at a fixed distance. For the diffraction pattern analysis that is used in the cross correlation algorithm or convolution kernels, equations used for diffraction angles and positions in two dimension are shown in FIG. 7. The defined r, s, and q spaces shown in FIG. 7 are used in the cross correlation image. To allow convolution with kernels, the image in the r space should be transformed into the q space.

The r plane, q plane and s plane equations used in the cross correlation algorithm are identified as follows. For the r plane: physical implementation on device pixel position follows the f tan θ rule for rectilinear lens. The r plane equation is r=f tan θ. For the q plane: diffraction patterns are uniform and rectilinear, and a shift invariance is needed for cross correlation algorithm. The q plane equation used by the cross correlation algorithm is q=f sin θ=m λ/d. For the s plane: virtual fθ lens image arc length is direct measure of angle which is used to locate laser. The s plane equation is s=fθ. In real time applications, inverse transform lookup tables (u,v) are used to go from detected image to rectilinear diffraction pattern. Transform from q to s plane is used to compute angle for location computation. The use of orthographic lens results in diffractions in the image that follow f sin θ resulting in natively rectilinear diffraction patterns. In this case, a r to q transformation is not needed and only minor distortion corrections are applied.

Figure 8:
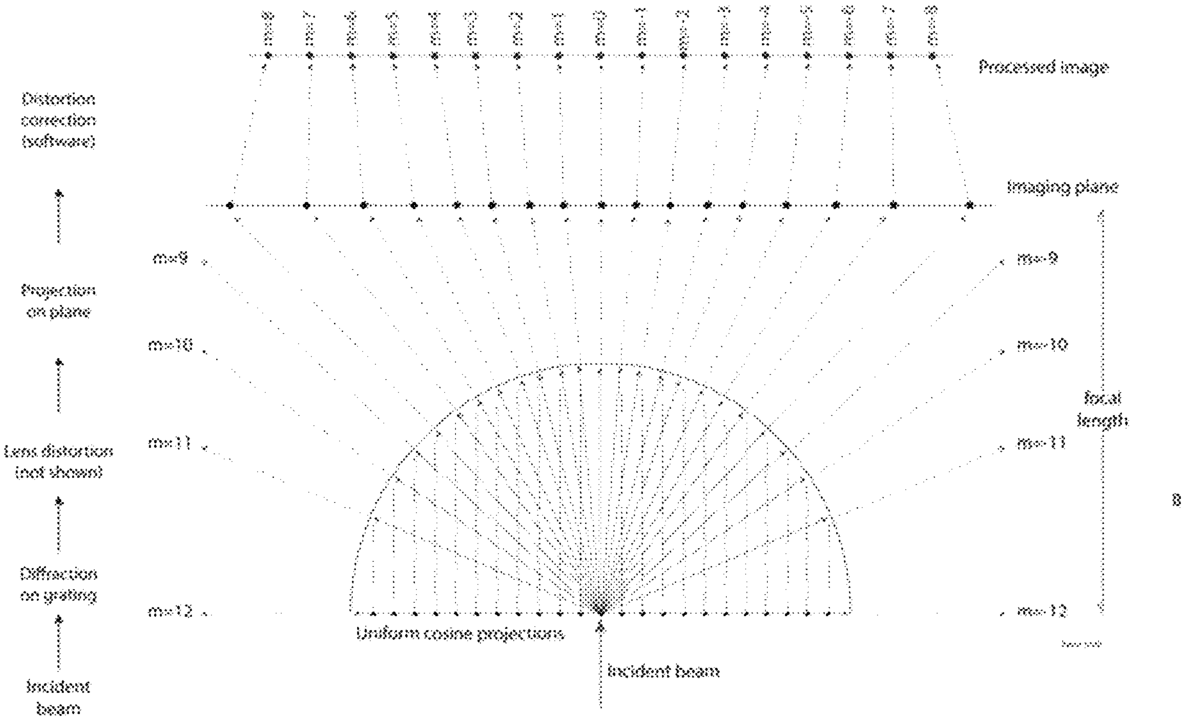
FIG. 8 illustrates the process of obtaining regularly pitched diffraction peaks according to embodiments described herein.

FIG. 8 illustrates the process of obtaining regularly pitched diffraction peaks from rectilinear lenses according to embodiments described herein. The process steps are listed to the right of the diagram with initial steps at the bottom followed by subsequent steps through the diffraction grating and processing components. As shown, initially an incident laser beam strikes the diffraction grating. The diffraction grating disperses the laser signal along signal paths ranging from m=−12 to m=+12 with m=0 being a path in line with the center of the laser beam along the focal length from the diffraction grating lenses to the image plane sensors. Distortion due to the lenses surrounding the diffraction grating will be experienced in the diffraction signal paths with higher numbers near the m=−12 and m=12 limits, but such lens distortion is not shown specifically in FIG. 8. The diffraction signals are next projected onto an image plane. The signals from the image plane are then processed by image transform, cross correlation and convolution kernels applied in software as described above as well as subsequently herein to provide distortion correction and other image processing to create a grid of regularized peaks which completes the illustration of FIG. 8. In an implementation using larger field of view lenses, the diffraction orders, n, included in the image plane can be extended.

Figure 9:
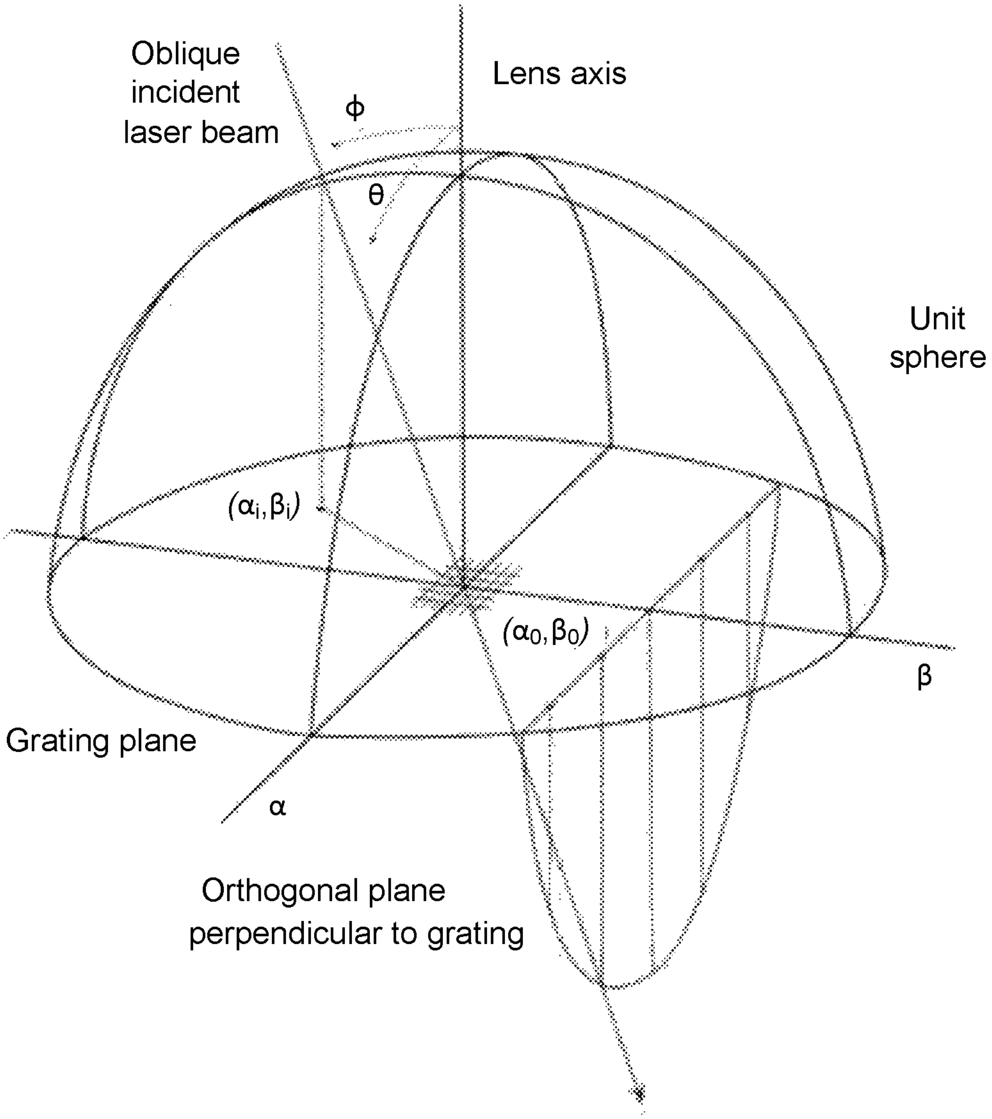
FIG. 9 illustrates diffraction based on laser light incident on a dual-axis diffraction grating in three dimensional space defined by a unit sphere.

FIG. 9 illustrates diffraction based on laser light incident on a dual-axis diffraction grating in three dimensional space defined by a unit sphere. The diagram shows an oblique angle strike from a laser onto a diffraction grating. The oblique strike angle is relative to the central axis of the diffraction grating defined by offset angles θ and ϕ. The diffraction image is shown projected onto a plane defined by α and β. The image plane is orthogonal to a plane perpendicular to the diffraction grating.

Figure 10:
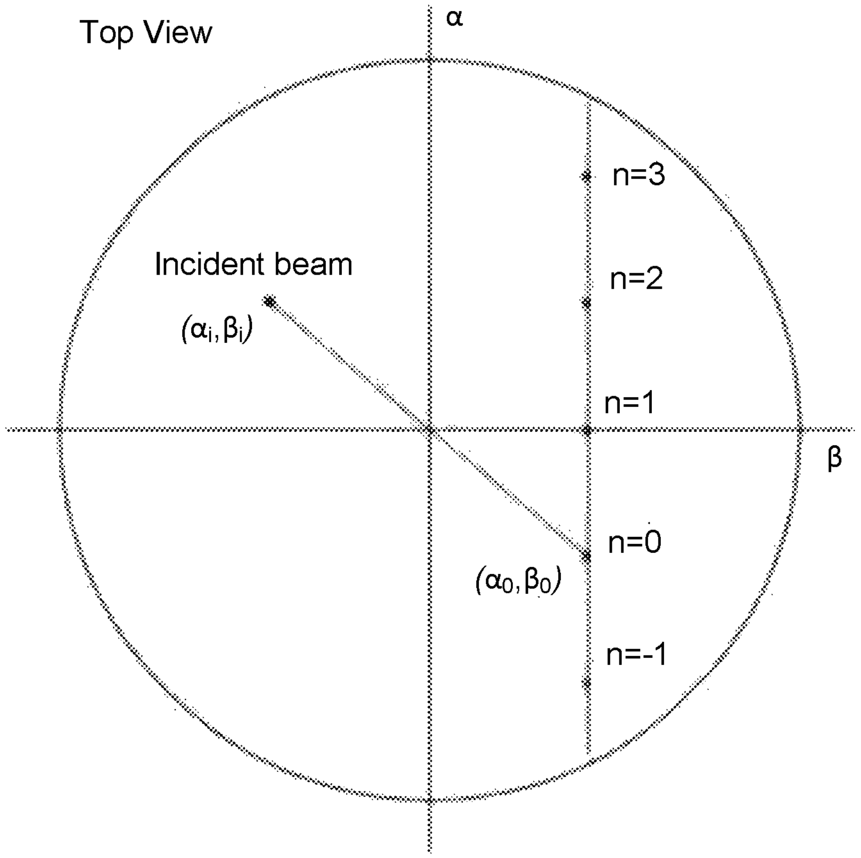
FIG. 10 shows a two dimensional cross sectional top view of the incident beam and resulting diffraction pattern obtained at the image plane in FIG. 9.

FIG. 10 shows a two dimensional cross sectional top view of the incident beam and resulting diffraction pattern obtained at the image plane in FIG. 9. As shown, the image when projected onto the plane from the dual-axis grating results in a uniformly pitched pattern, with pitch referring to the distance between image peaks. The equations used by the convolution kernels to identify the laser beam incidence angle α relative to the central axis of the diffraction grating are as follows:

$$\alpha_i = \sin\theta_0\cos\phi_0\alpha_m = \sin\theta_m\cos\phi_0\beta_i = \sin\phi_0$$

$$\alpha_i + \alpha_m = \frac{m\lambda}{d}\beta_m + \beta_i = 0$$

The diffraction grating and sensors 104 as well as other components of FIG. 1 are used in embodiments to characterize a laser source as well as locate the laser source position. Such characterization and location determination will be described in subsequent sections.

A. Characterization of Wavelength and Irradiance

Figure 11:
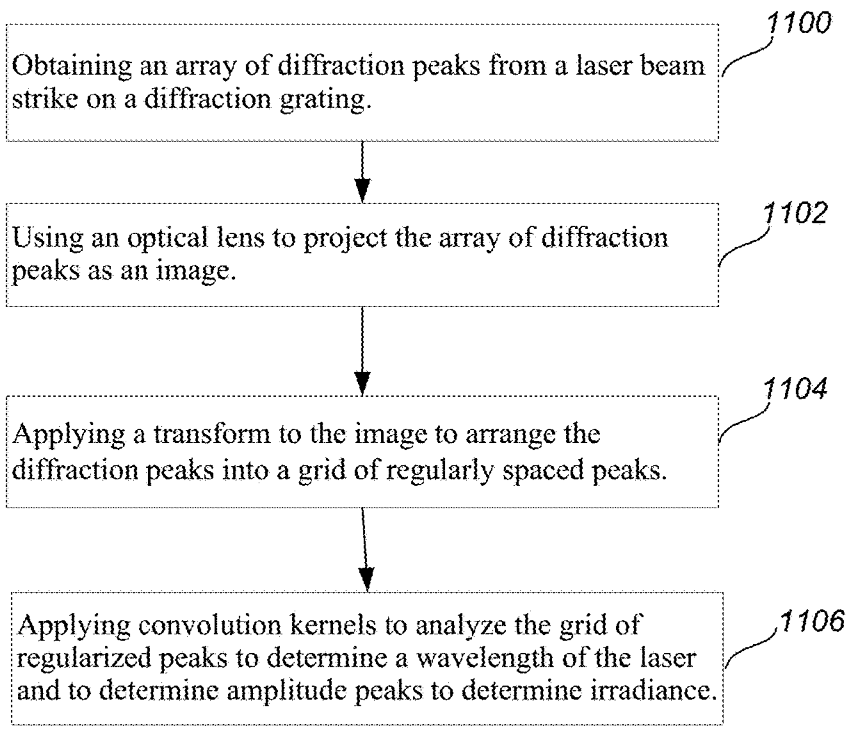
FIG. 11 is high level flow diagram of method steps used to determine wavelength of a laser beam detected by a sensor system using diffraction gratings according to embodiments.

FIG. 11 is high level flow diagram of method steps used to determine wavelength of a laser beam source detected by a sensor system using a diffraction grating with sensors 104 as well as the cross-correlation algorithm and convolution kernels described above applied using the system processor and memory 200 according to embodiments. Wavelength is one characterization of the laser source in accordance with embodiments described herein. In a first step 1100 to determine the wavelength of the laser beam source an array of diffraction peaks from a laser beam strike is received at the diffraction grating of the diffraction grating and with sensors 104. Next in step 1102, the optical lens is used to project the array of diffraction peaks as an image that is received by optical sensors. Next in step 1104, a transform is applied to the image using a distortion map to arrange the diffraction peaks into a grid of regularly spaced peaks. Finally in step 1106 convolution kernels are applied as described previously to analyze the grid of regularized peaks to determine a wavelength and irradiance of the laser source.

FIGS. 12A-E provide further details for the steps of FIG. 11 as well as additional steps that can be added to those of FIG. 11 to characterize one or more laser sources based on wavelength.

Figure 12A:
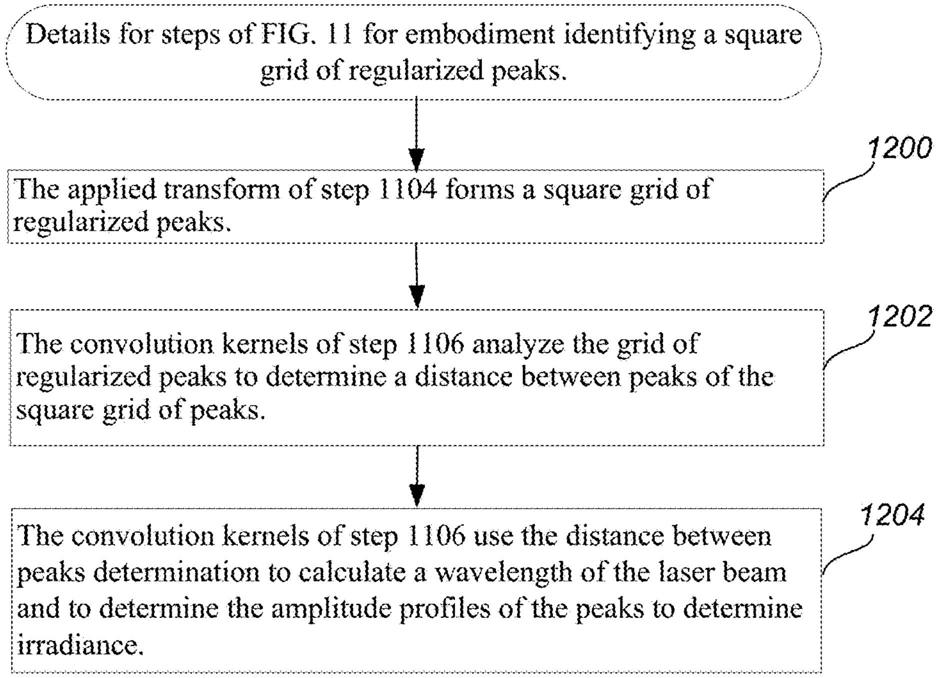
FIG. 12A is a high level flow diagram of steps used in FIG. 11 that includes identifying a square grid of regularized peaks.

FIG. 12A is a high level flow diagram providing details of steps used in FIG. 11 that include identifying a square grid of regularized peaks. In step 1200 the details of step 1104 show that the transform forms a square grid of regularized peaks. In step 1202, the convolution kernels of step 1106 analyze the grid of regularized peaks to determine the distance between peaks of the square grid of peaks. In step 1204 the convolution kernels of step 1106 distance between peaks determination is used to calculate a wavelength of the laser beam. Analysis of the intensity profile is used to determine the laser irradiance.

Figure 12B:
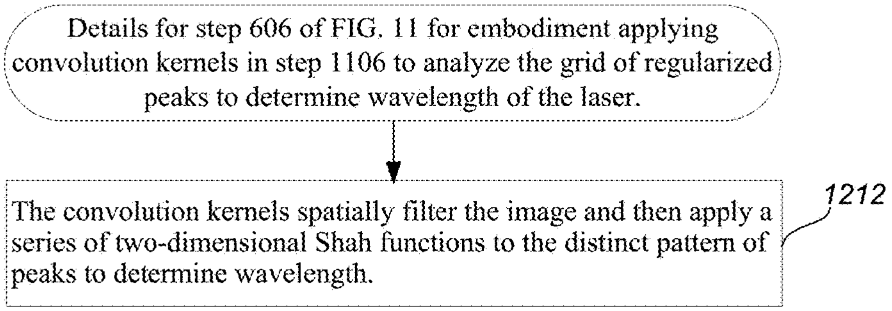
FIG. 12B is a high level flow diagram showing a step used in FIG. 11 with convolution kernels that apply a Shah function to the pattern of regularized peaks to determine wavelength

FIG. 12B is a high level flow diagram showing in FIG. 11 that the convolution kernels can apply a Shah function to the pattern of regularized peaks to determine wavelength.

Figure 12C:
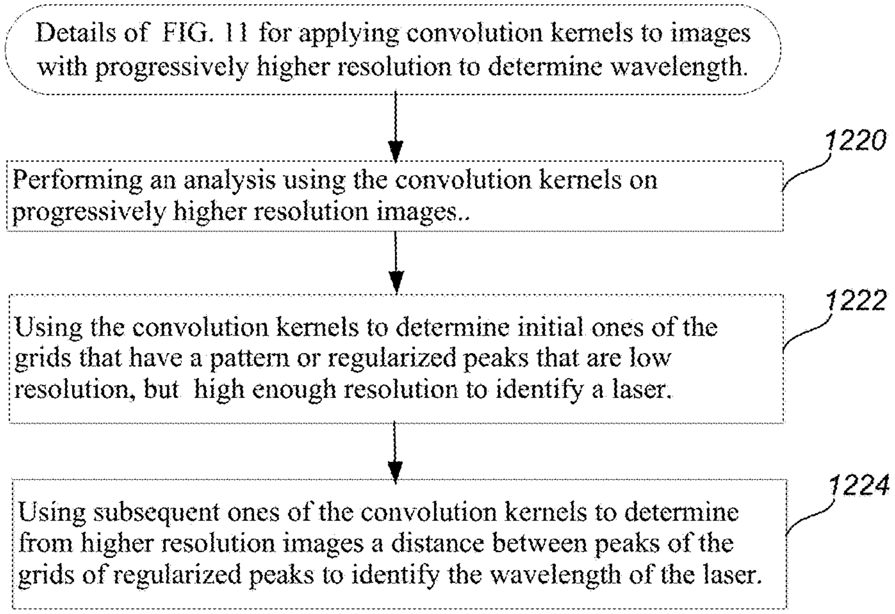
FIG. 12C is high level flow diagram showing steps used for FIG. 11 with convolution kernels initially identifying laser light using lower resolution images and then uses higher resolution images to determine wavelength of the lasers.

FIG. 12C is high level flow diagram showing steps used for FIG. 11 with convolution kernels initially identifying laser light using lower resolution images and then using higher resolution images to determine wavelength of the lasers. In an initial step 1220, convolution kernels are applied to progressively higher resolution images. In step 1222, convolution kernels are first applied to low resolution images to determine initial ones of the grids that have a pattern or regularized peaks that are low resolution that indicate a laser light source may be present, but the resolution not being high enough to identify a laser. In step 1224, subsequent convolution kernels are applied to progressively higher resolution images to identify a distance between peaks of the grids of regularized peaks to specifically identify the wavelength of the laser.

In one embodiment of FIG. 12C, separate optical image sensors are used in the diffraction grating with sensors having different signal reception resolution. Secondary sensors are used for screening signals received to identify the laser beam source relative to non-lasers. Primary sensors with higher power consumption and resolution than the secondary sensors are then used by the convolution kernels to actually identify the wavelength of the laser sources identified by the secondary sensors.

Figure 12D:
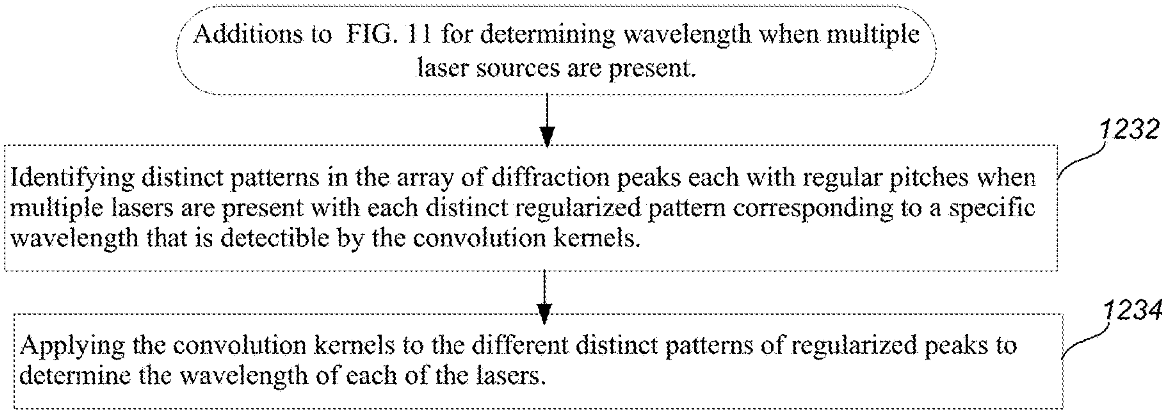
FIG. 12D is a high level flow diagram showing additional steps used for FIG. 11 when multiple laser sources are present to identify the wavelength of each laser.

FIG. 12D is a high level flow diagram showing additional steps used for FIG. 11 when multiple laser sources are present to identify the wavelength of each laser. In step 1232, separate distinct patterns in the array of diffraction peaks are identified each with regular pitches when multiple lasers are present with each distinct regularized pattern corresponding to a specific wavelength that is detectible by the convolution kernels. In step 1234, the convolution kernels are then applied to the different distinct patterns of regularized peaks to determine the wavelength and irradiance of each of the individual lasers.

Figure 12E:
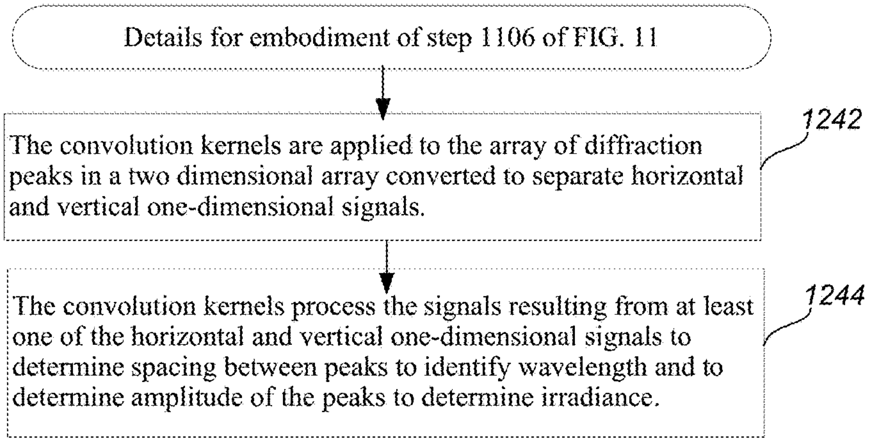
FIG. 12E is a high level flow diagram showing steps used in FIG. 11 for applying convolution kernels using a two dimensional array of diffraction peaks converted into horizontal and vertical one dimensional signals.

FIG. 12E is a high level flow diagram showing steps used in FIG. 11 for applying convolution kernels using a two dimensional array of diffraction peaks converted into horizontal and vertical one dimensional signals. In a first step 1242, the convolution kernels are applied to the array of diffraction peaks in a two dimensional array converted to separate horizontal and vertical one-dimensional signals. In a second step 1244, the convolution kernels process the signals resulting from at least one of the horizontal and vertical one-dimensional signals to determine spacing between peaks to identify wavelength.

Figure 12F:
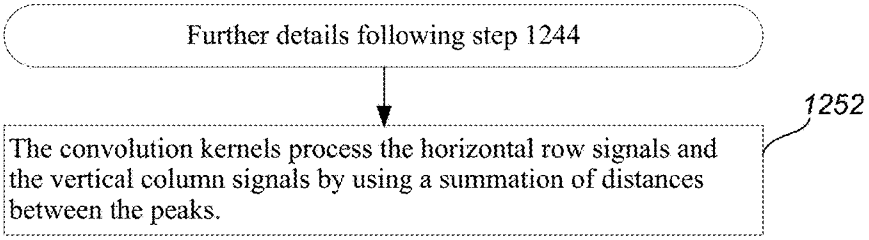
FIG. 12F is a high level flow diagram showing further details of FIG. 12E where the wherein the convolution kernel uses a summation the horizontal and vertical one-dimensional signals.
Figure 13:
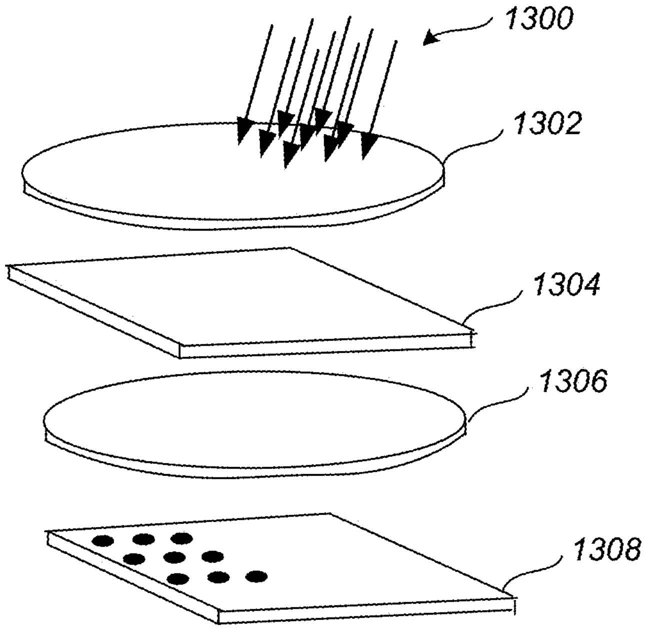
FIG. 13 illustrates a laser beam strike received by a laser detection system illustrating position determination information used when using a diffraction grating with sensors showing the effect of a laser beam strike offset relative to the laser detection system so that the regularly spaced peaks are projected onto one quadrant of the image plane.

FIG. 12F is a high level flow diagram showing further details of FIG. 12E in a step 1252 wherein the convolution kernel analysis uses a summation of the horizontal and vertical one-dimensional signals to process the signals.

B. Location Determination

The diffraction grating and sensors 104 as well as other components of the system of FIG. 1 are further used to determine the location of a laser source. Such position location determination will be described in this section.

Figure 14:
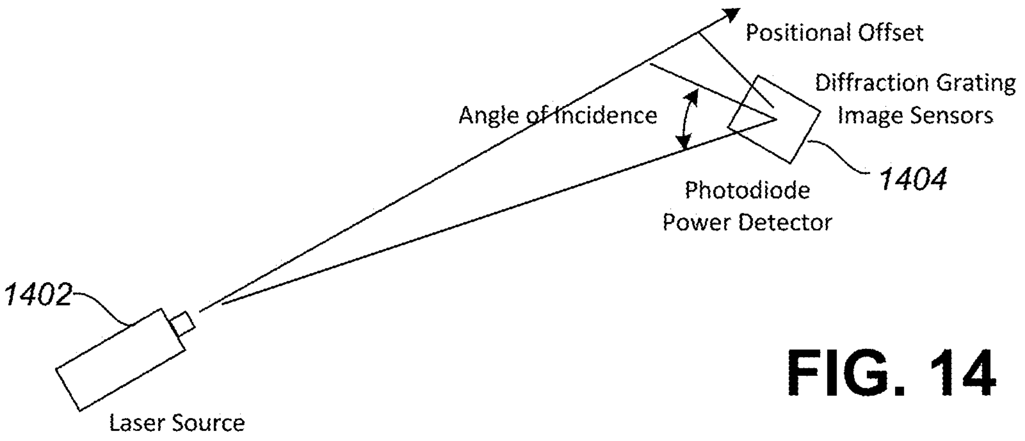
FIG. 14 illustrates a laser beam strike onto a laser detection system illustrating position determination used using a diffraction grating with sensors when the laser beam strike beam central axis has both an angle of incidence and an offset angle relative to the image plane of optical sensors.

FIG. 14 illustrates a laser beam strike onto a laser detection system illustrating position determination using a diffraction grating with sensors 104 of FIG. 1 when the laser beam central axis has both an angle of incidence and an offset angle relative to the image plane of optical sensors. FIG. 14 shows a laser source 1402 and a plane 1404 supporting the optical image sensors of the diffraction grating with sensors 104 of FIG. 1 as well as the photodiode power detector 102 sensors of FIG. 1. As shown in FIG. 14, the angle of incidence is the angle between the incoming laser beam from a laser source 1402 and a line normal to a center of the plane 1404 supporting the optical image sensors. The positional offset angle is between the emitted laser beam center from the laser source 1402 and the center of the optical image sensor plane 1404. The positional offset being measured in one embodiment as the offset between the center of the laser beam and the center of the sensor array in terms of distance from the center of the beam to a position where power is reduced to $1/e^2$.

Figure 15:
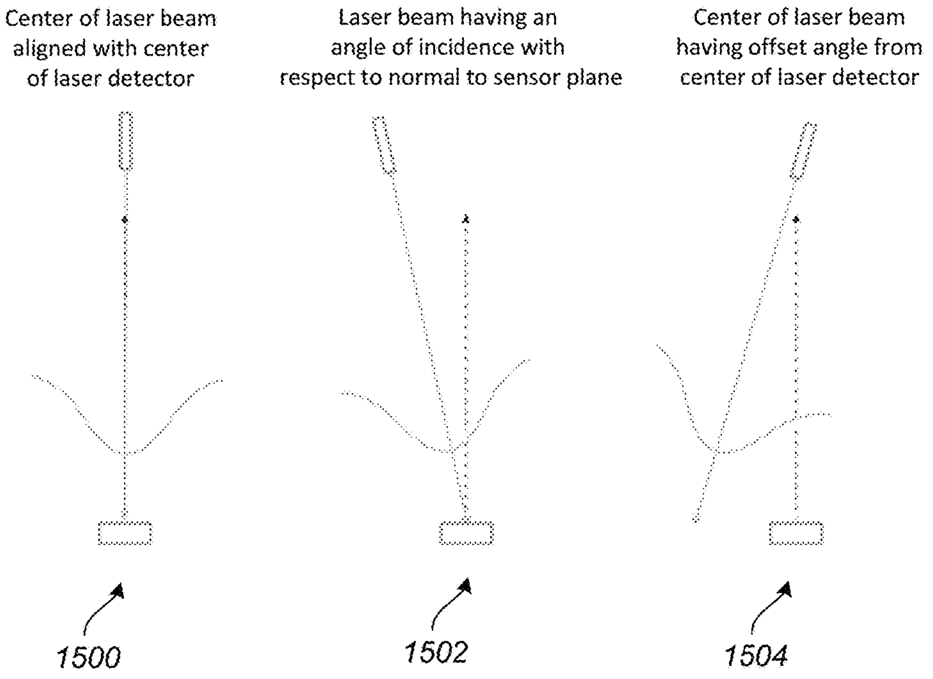
FIG. 15 illustrates in further detail the angle of incidence and offset angle of a laser beam strike relative to the image plane of optical sensors shown generally in FIG. 14.

FIG. 15 illustrates in further detail the angle of incidence and offset angle of a laser beam strike relative to the image plane of optical sensors shown generally in FIG. 14. FIG. 15 provides three position illustrations 1500, 1502 and 1504 each showing a laser source and laser detector to illustrate the needed angle of incidence of the center of a laser beam relative to the center of the optical image sensors receiving the diffraction grating image of the laser detector as well as an offset angle of the laser detector that are needed to calculate position information of the laser source. Block diagram 1500 shows when the center of the laser beam from the laser source is aligned with the center of the image sensors of the laser detector. In this case the angle of incidence is 0 degrees and the offset angle is zero degrees, so calculations due to the offsets are not warranted. Block diagram 1502 shows the laser beam having an angle of incidence relative to the normal of the plane of the laser detector image sensors, or in other words the direction of the normal axis of the image sensor is offset from the direction from the sensor to the laser source. Block diagram 1504 shows the center of the laser beam having a positional offset relative to the center of the image sensor of the laser detector, or in other words the direction of the emitted laser beam is offset from the direction from the laser to the detector.

Figure 16:
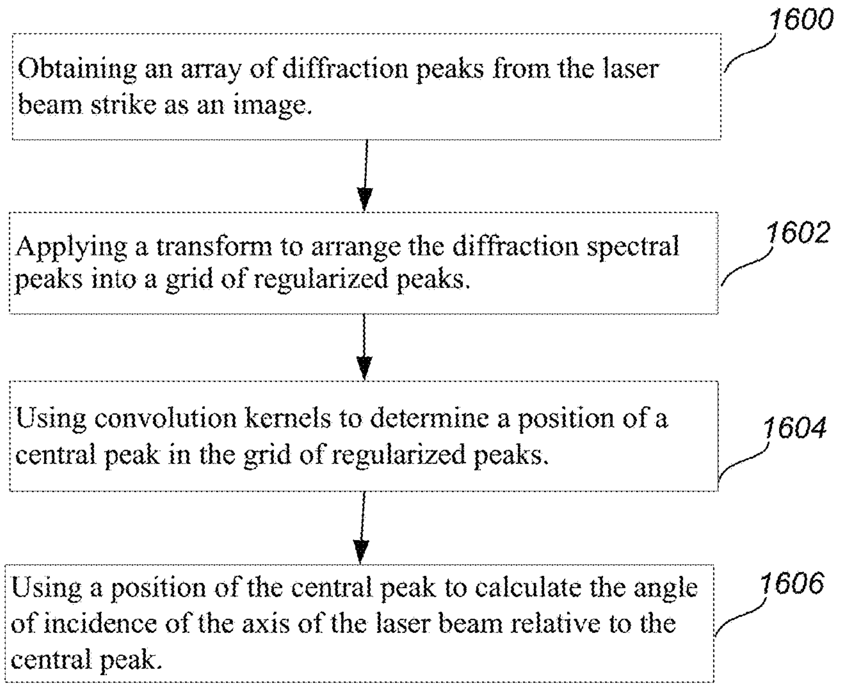
FIG. 16 is a high level flow diagram of an embodiment of steps to determine the angle of incidence using diffraction peaks obtained from a laser beam strike on the laser detector.

FIG. 16 is a high level flow diagram of an embodiment of steps to determine the angle of incidence using diffraction peaks obtained from a laser beam strike on the laser detector. The angle of incidence is then subsequently used to determine the location position of the laser source. The image processor in FIG. 16 uses software to then apply the steps of FIG. 16 to determine the angle of incidence using the signals from the image plane sensors 202 of the diffraction grating with sensors 104 shown in FIG. 2. The image processor initially in step 1600 obtains an array of diffraction peaks from the laser beam strike as an electronic image. The image processor is part of the processor and memory system 100 of FIG. 1 that receives signals from the image plane sensors 202 shown in detail in FIG. 2 that are provided to a processor when a laser beam is incident on the diffraction grating and sensor system 104. The processor in step 1602 applies a transform that arranges the spectral peaks into a grid of regularized peaks. Further, after applying the transform, the processor in step 1604 uses convolution kernels to determine a central peak in the grid of regularized peaks. The central peak is used to identify the location of the peak of the laser beam. The processor thus implements step 1606 by using the central peak determination to calculate the angle of incidence of the axis of the laser beam relative to a central axis normal to the image plane containing the optical sensors receiving the diffraction grating image.

FIG. 17A is a flow diagram that shows further steps added to those in FIG. 16 to determine the position of a laser source relative to a laser detector system including use of a global navigation satellite system (GNSS) and inertial navigation system (INS) position system 106 of FIG. 1, and a ground map resource. With the angle of incidence determined according to the steps of FIG. 16, the location of the laser source relative to the laser detector can be determined with step 1702. With the global navigation satellite system (GNSS) and inertial navigation system (INS) position system 106, the position of the laser detector in an aircraft relative to a location on the ground beneath an aircraft can be determined. A ground map resource can then be used with the GNSS and INS position to locate the aircraft and then the laser source on the map.

FIG. 17B is a flow diagram that shows further steps to those in FIG. 16 to determine position of a laser source relative to a laser detector system including measurement of an offset axis of the image plane receiving the laser strike through a diffraction grating. In step 1702 the offset axis of the plane containing the optical image sensors is measured relative to a plane perpendicular to the central axis of the laser beam using a tilt, pan and roll indicator 107 of FIG. 1. In step 1704 the location of the laser source is then determined relative to the laser detector by using the offset axis measurement.

FIG. 17C is a flow diagram that shows further steps to those in FIG. 16 for an embodiment to further determine a position of the central peak in the grid of regularized peaks when saturation regions occur in detected image peaks. For the steps of FIG. 17C in step 1722, saturation of a region of the image sensors providing the array of diffraction peaks containing the central peak is detected. Once saturation is detected, in step 1724 the position of the central peak is determined based on irradiance measured from ones of the image sensors providing the array of diffraction peaks outside of the saturation region.

Embodiments provide a strategy for extending the dynamic range of the laser detector that would otherwise be limited by saturation regions. Information can be obtained from the image sensor both when the exposure is within saturation, as well as when the saturation occurs. Since the algorithm is based on spatial information, saturated diffraction peaks continue to provide information about the location of the peaks even if the amplitude of saturated peaks is inaccurate. The amplitude of the saturated peaks can be inferred by measuring the unsaturated higher order diffraction peaks since the envelope of the intensity of the peaks can be computed from diffraction theory.

Saturation occurs in individual image sensor due to the irradiance of the laser beam being too high, and higher than the peak value the image sensor can receive. Due to the saturation, the amplitude information on the individual diffraction peaks is lost. Convolution kernels are designed in embodiments to retain the diffraction peaks and eliminate uniform bright field regions that are in saturation. The higher order diffraction peaks thus can still be determined based on an estimation from the unsaturated image sensors. Information from the high order diffraction peaks, such as pitch and amplitude, can thus still be used to determine the power and wavelength and irradiance of the laser, as well as the position of the zeroth order diffraction peak.

Figure 17D:
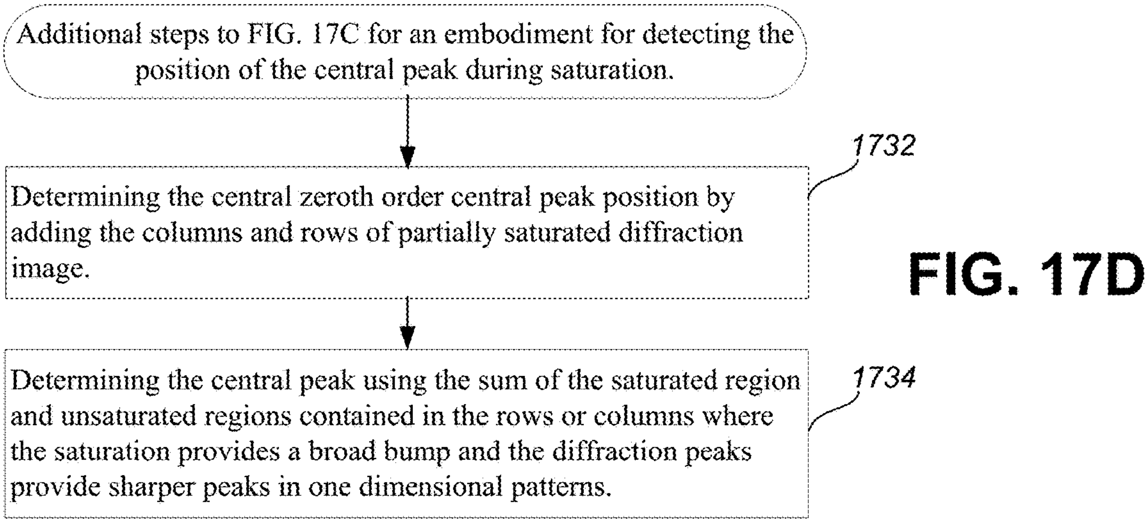
FIG. 17D is a flow diagram that shows further steps to those in FIG. 17C for detecting the position of the central peak during saturation.

FIG. 17D is a flow diagram that shows further steps to those in FIG. 17C for an embodiment of detecting the position of the central peak during saturation. In a first step 1732 the columns or rows of partially saturated diffraction image are added. In step 1734, the central zeroth order peak is then determined using the sum of the saturated region and unsaturated regions contained in the rows or columns where the saturation provides a broad bump and the diffraction peaks provide sharper peaks that is overlaid on the broad bumps.

Figure 17E:
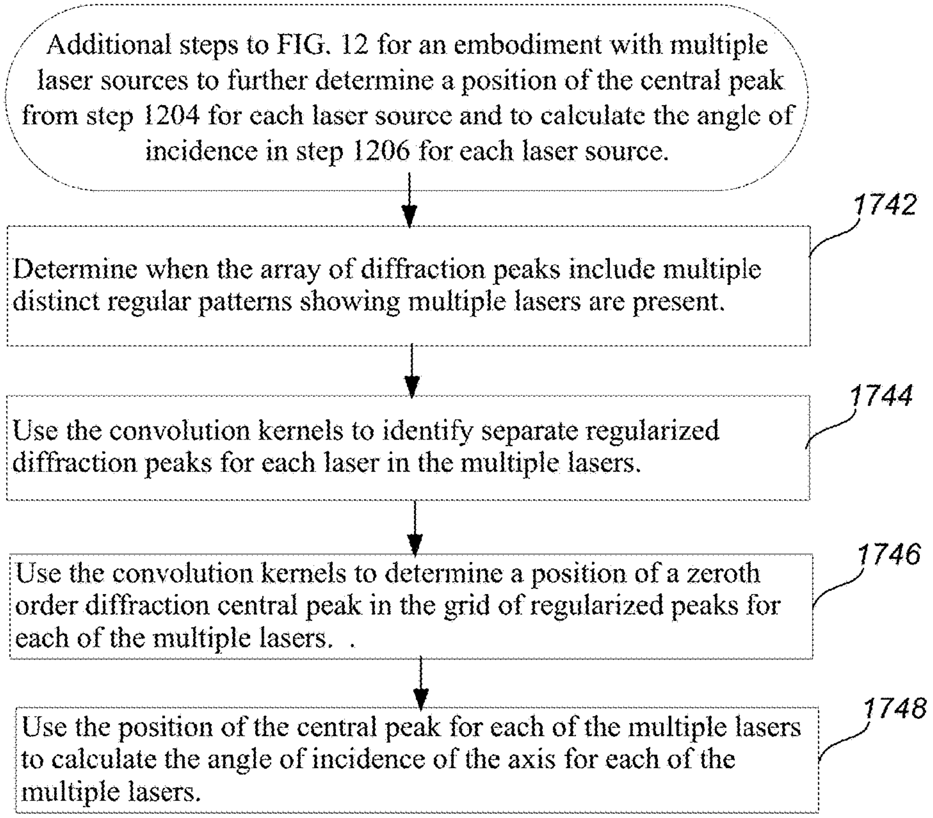
FIG. 17E is a flow diagram that shows additional steps to those in FIG. 16 when multiple laser sources are present to determine the wavelength of each laser.

FIG. 17E is a flow diagram that shows additional steps to those in FIG. 16 when multiple laser sources are present to determine the wavelength of each laser. In a first step 1742, a determination is made when the array of diffraction peaks with multiple distinct regular patterns showing multiple lasers are present. In a next step 1744, the convolution kernels are used to identify the separate regularized diffraction peaks for each laser in the multiple lasers. In step 1746, the convolution kernels are further used to determine a position of a zeroth order diffraction central peak in the grid of regularized peaks for each of the multiple lasers. Finally in step 1748, the determined position of the central peak for each of the multiple lasers is used to calculate the angle of incidence of the axis for each of the multiple lasers.

C. Characterization of Laser Source Power

Embodiments described herein determine the laser source power by using the photodiode irradiance power sensors 102 that contain an array of sensors separate from the optical image sensors as well as with the diffraction grating and sensors 104 of FIG. 1 to measure irradiance power level. Because the irradiance power level is affected by the angle of incidence of the laser beam upon the optical image sensors, the angle of incidence measurement obtained using the diffraction grating and sensors 104 described above is used in the determination of irradiance power level. Further details of embodiments for determining emitted power level of the laser source are described herein.

Figure 18:
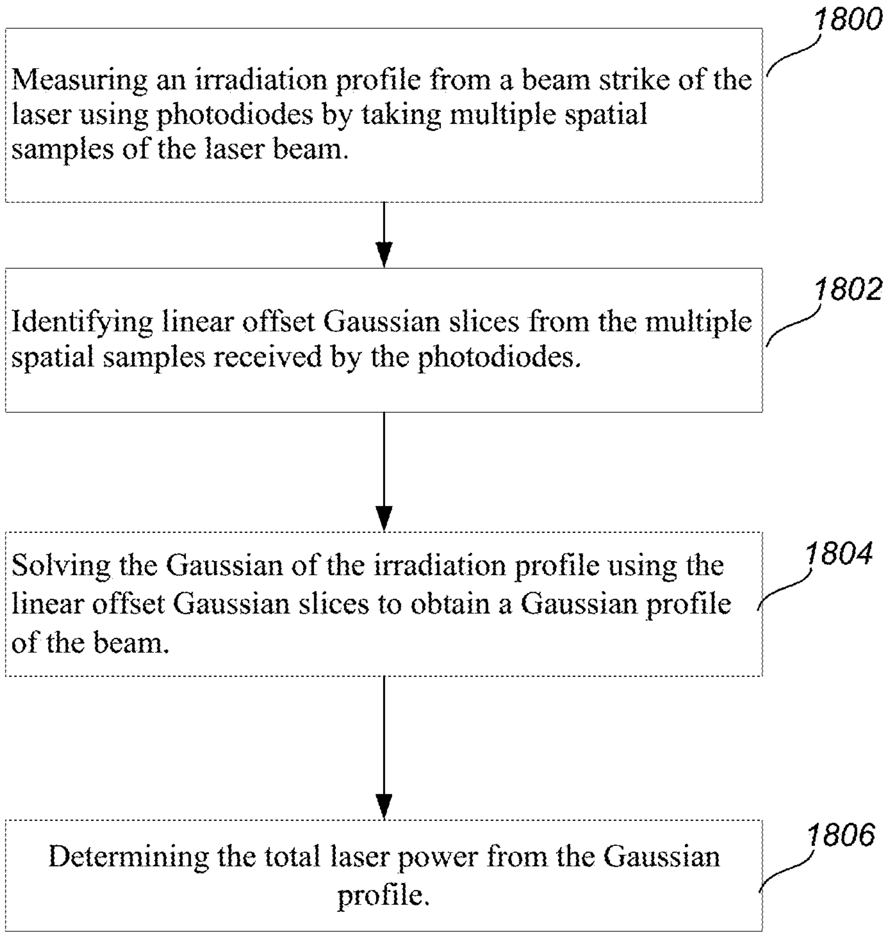
FIG. 18 is a high level flow diagram of one embodiment of initial steps of a method for detecting the power of a laser according to embodiments described herein.

FIG. 18 is a high level flow diagram of one embodiment of initial steps of a method for detecting the power of a laser according to embodiments described herein. The steps of FIG. 18 are performed using the processor of the system processor and memory 100 in conjunction with the photodiode irradiance power sensors 102 of FIG. 1. In the first step 1800, an irradiation profile from a beam strike of the laser is measured using the photodiodes of the photodiode irradiance power sensors 102 of FIG. 1 by taking multiple spatial samples of the laser beam. Note that the photodiodes of the photodiode irradiance power sensors 102 are provided separate from the optical sensors of the diffraction grating with sensors 104. In step 1802, the processor of the processor and memory 100 identifies linear offset Gaussian slices from the multiple spatial samples received by the photodiodes. In step 1804, the linear offset Gaussian slices are used by the processor to solve the Gaussian of the irradiation profile to obtain the Gaussian profile of the laser beam. In step 206, the Gaussian profile of the laser beam is used to determine total emitted laser power. The total laser power is found by taking the integral of the Gaussian profile.

Figure 19:
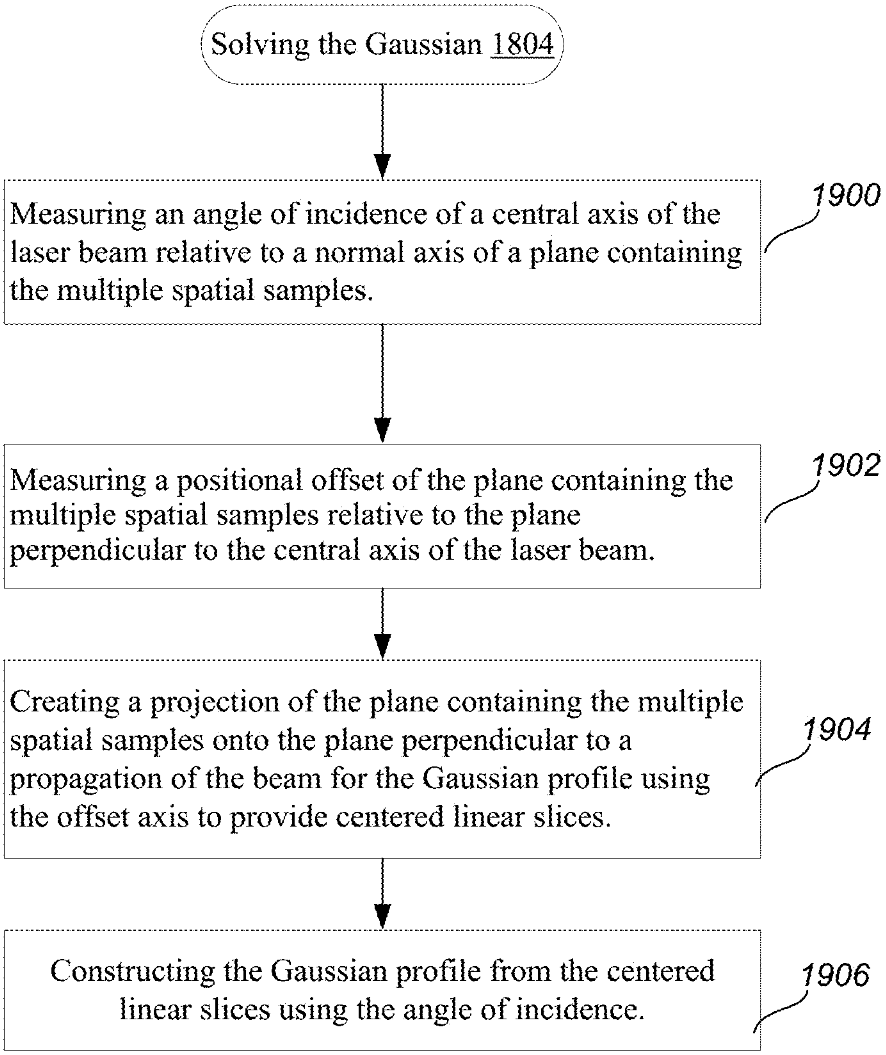
FIG. 19 is a high level flow diagram of an embodiment of steps to solve for the Gaussian in step 204 of FIG. 18.

FIG. 19 is a high level flow diagram of an embodiment of steps to solve for the Gaussian in step 1804 of FIG. 18. The steps of FIG. 19 are performed using the processor of the system processor and memory 100 along with the diffraction grating with sensors 104 and the heading, pitch and roll detector 107 of FIG. 1. In step 1900, to solve for the Gaussian, the angle of incidence of the central axis of the laser beam is measured relative to a normal axis of a plane containing the photodiodes that detect the multiple spatial samples. To determine angle of incidence in step 1900, reference can be made to FIG. 16 as well as subsequent FIGS. 17A-17E that illustrate determination of the angle of incidence relative to a plane containing the photodiodes that uses the diffraction grating with sensors 104. Further in step 1902, a positional offset of the plane containing the multiple spatial samples is measured relative to a plane perpendicular to the central axis of the laser beam. The offset axis determined in step 1902 is determined using the steps of FIG. 17B that also use the diffraction grating measurements.

Next in step 1904 of FIG. 19, the offset linear slices obtained from the photodiodes of the photodiode power detector (no longer utilizing the diffraction grating optical sensors) are converted spatially by the processor to provide centered linear slices to enable calculation of the Gaussian that the offset linear slices do not provide. The conversion is accomplished by creating a projection of the plane containing the multiple spatial samples onto the plane perpendicular to a propagation of the beam for the Gaussian profile using the positional offset to provide the centered linear slices. Finally in step 1906, the centered linear slices determined are used by the processor to construct the Gaussian profile.

Figure 20:
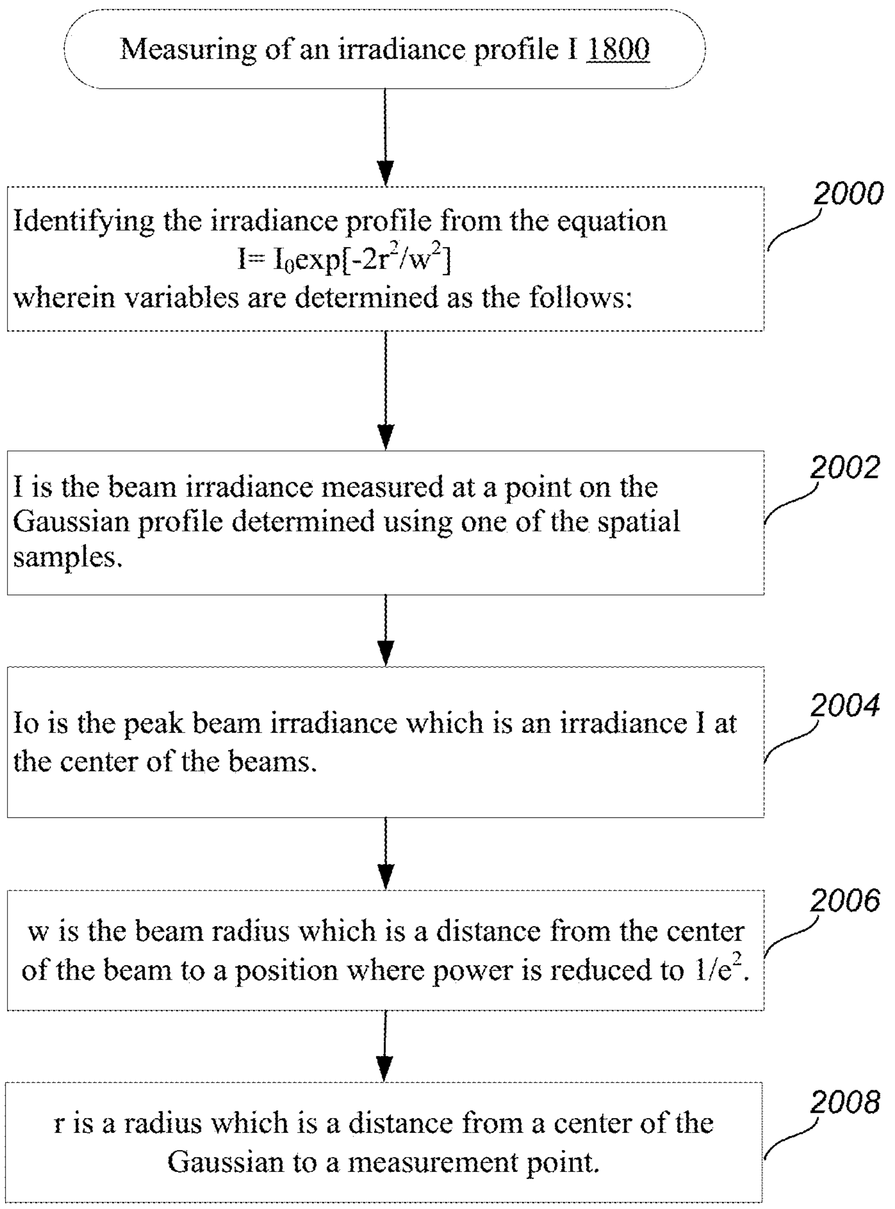
FIG. 20 is a high level flow diagram of one embodiment of steps to measure the irradiance profile I from the method step 200 of FIG. 18.

FIG. 20 is a high level flow diagram of one embodiment of steps to measure the irradiance profile I from the method step 1800 of FIG. 18. As in FIG. 2, the steps of FIG. 20 are performed using the processor of the system processor and memory 100 in conjunction with the photodiode irradiance power sensors 102 of FIG. 1. In a first step 2000, the irradiance profile is obtained from measurements of irradiance from the photodiode irradiance power sensors 102 using the processor of the system processor and memory 100 using the following equation:

$$I = I_0 \exp[-2r^2/w^2]$$

To determine I, in step 2002, the beam irradiance I is first measured by the processor at a point on the Gaussian profile determined using one of the spatial samples from the photodiodes. In step 2004, Io is determined by the processor as the peak beam irradiance of the Gaussian laser profile which is an irradiance I at the center of the beam. In step 2006, w is determined by the processor using the photodiode measurements as the beam radius which is a distance from the center of the beam to a position where power is reduced to $1/e^2$. Finally, in step 508, the radius r is determined by the processor from the photodiodes with r being a distance from a center of the Gaussian to a measurement point. Further calculations made by the processor also use the parameter c of the Gaussian which is described to follow.

The irradiance I can also be expressed as follows:

$$I = 2P/\pi w^2 \cdot \exp[-2r^2/w^2]$$

with P being the total power in the beam.

For a radially symmetric Gaussian, the equation for I, or I(r) expressed in terms of radius, can be given as follows:

$$I(r) = I_0 e^{-cr^2}$$

This equation for I in cartesian coordinates, or I(x,y), with peak position ($u_x$, $u_y$) relative to the sensor position, is given by:

$$I(x, y) = I_0 e^{-c[(x-\mu_x)^2+(y-\mu_y)^2]}$$

The total laser power can be calculated as:

$$P = \pi I_0/c^2$$

Because detection of the laser beam only provides a sampling of irradiance at the points detected, the Gaussian provides a irradiance profile for determining the total power P based on the sampling received. The irradiance profile depends on distance r from the origin, or beam center, from which the irradiance signals received are located. Details of how the photodiode sensors can be used by the processor to take slices of the total Gaussian with such offsets are described with respect to subsequent figures that illustrate how the slices taken off center of the beam can be used to determine the total Gaussian. Gaussian functions used herein represent the solution to a diffraction limited light beam propagation. A Gaussian function measured can then be used to determine the total irradiance profile I(r) expressed previously above with manipulation to account for any offset from the center of the beam where the Gaussian function is taken.

Figure 21:
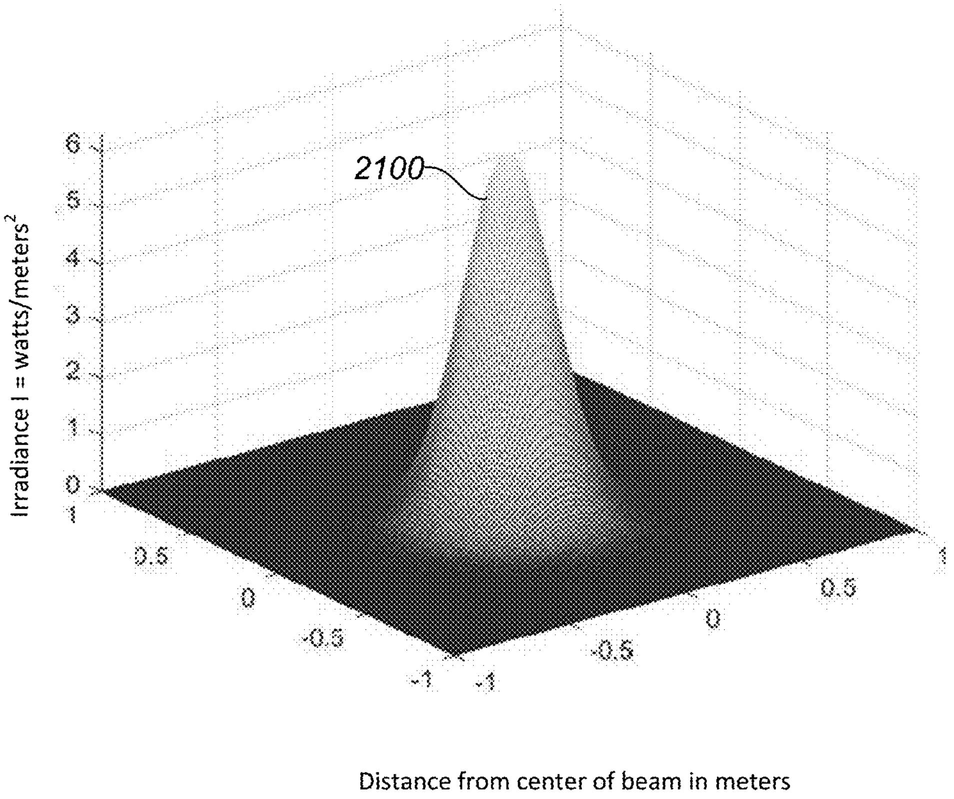
FIG. 21 is a three dimensional graph illustrating a total Gaussian profile 700 of a laser beam obtained by taking the irradiance at multiple points according to the steps of FIG. 20 and then obtaining the Gaussian profile according to the method of FIG. 18.

FIG. 21 is a three dimensional graph illustrating a total Gaussian profile 700 of a laser beam obtained by taking the irradiance at multiple points according to the steps of FIG. 20 and then obtaining the Gaussian profile according to the method of FIG. 18. The vertical axis of the graph shows measured irradiance I in watts/meter$^2$ of the Gaussian profile 2100. The horizontal axis plane shows a distance from the center of the beam along an x-y axis plane, with the center of the beam being the distance at 0 meters and other distances away from the beam center being expressed in meters of 0.5, 1.0, −0.5 and −1.0. The photodiode irradiance power detectors 102 only take a partial measurement, or one or more slices, of the total Gaussian profile 2100. Embodiments described subsequently herein enable the total Gaussian profile 2100 to be created from those slice measurements.

Figure 22:
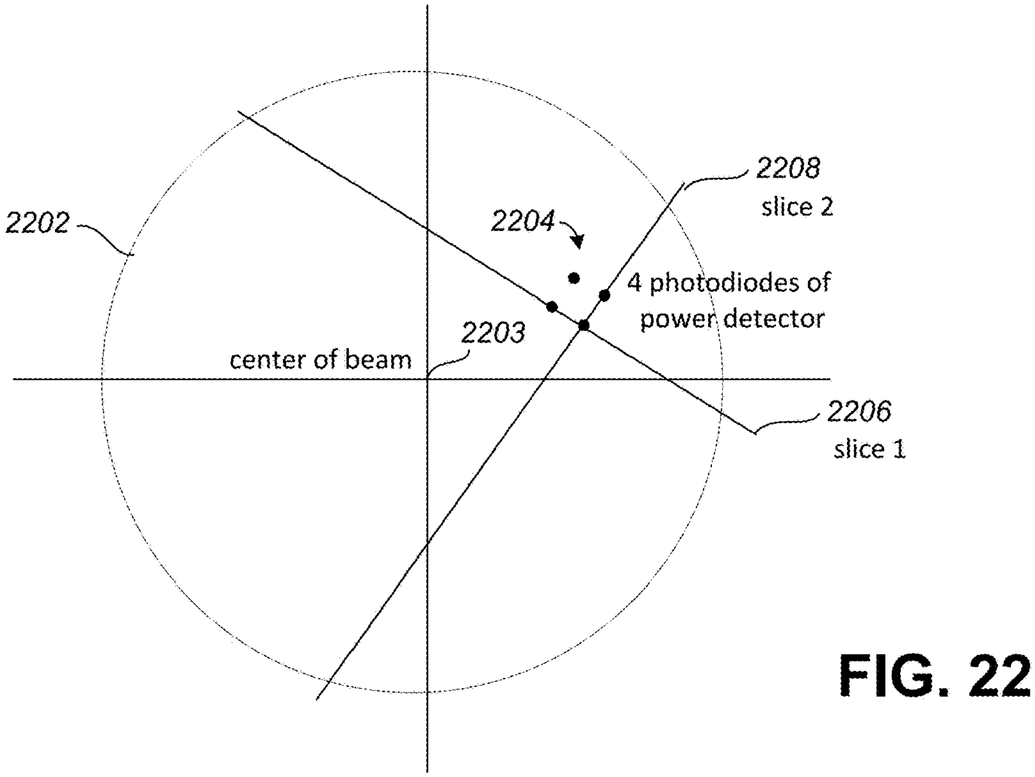
FIG. 22 illustrates two slices measured by two pairs of photodiodes through the Gaussian profile for a laser beam, such as illustrated in FIG. 21.

FIG. 22 illustrates two slices measured by two pairs of photodiodes through the Gaussian profile for a laser beam, such as illustrated in FIG. 21. The slices are determined by measurement of irradiance I from at least a pair or sensors using the mathematical formula for I described with respect to FIG. 20. With more and more measured slices beyond which a Gaussian can be uniquely defined, the calculations according to FIG. 18 can be used to determine the entire Gaussian with higher accuracy, for example, by minimizing the sum of errors. In FIG. 22, circle 2202 illustrates the beam strike on the laser power detector. Crosshairs converging illustrate the location of the center of the beam 2203 where the peak irradiance $I_0$ is obtained. Four photodiode power detectors 2204 are placed in a plane at the corners of the power detector 102 of FIG. 1 and provide measurements for detection slices, slice 1 2206 and slice 2 2208. The slices take measurement of a portion of the Gaussian profile. Two of the photodiode detectors 2204 are used to measure each of the slices 2206 and 2208 of FIG. 22. Although not shown, additional slices can be taken using combinations of two of the photodiodes to better characterize the Gaussian profile.

Figure 23:
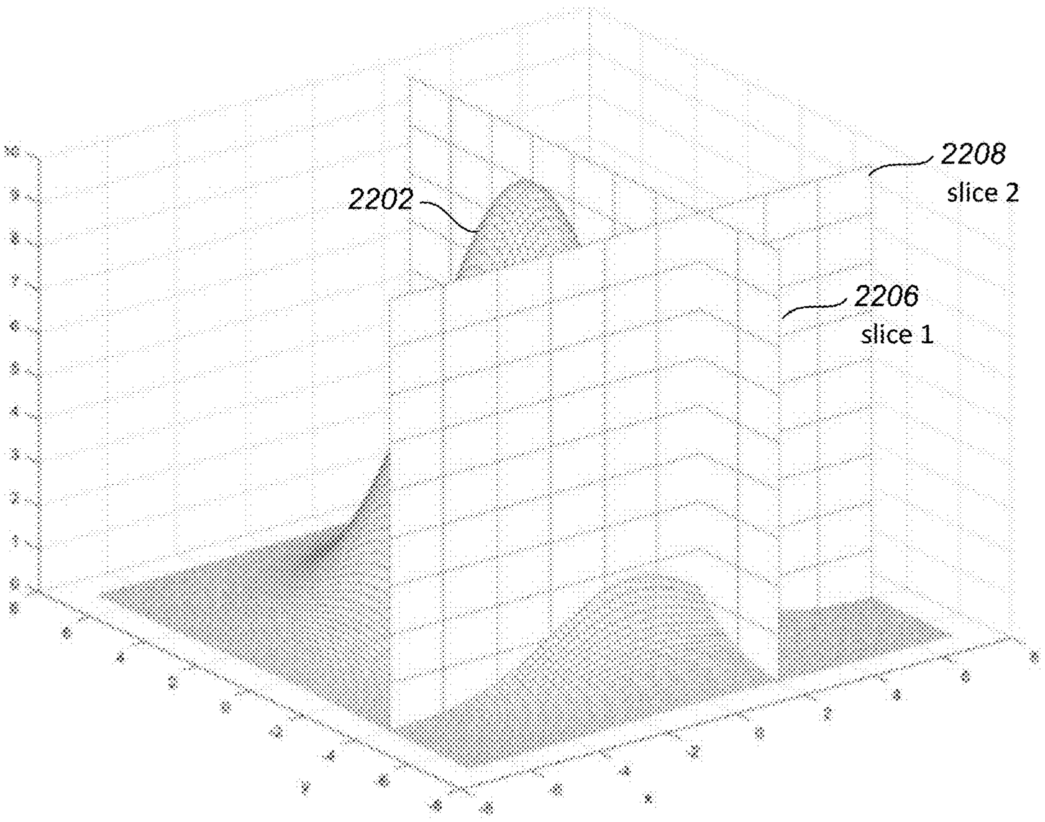
FIG. 23 is a three dimensional graph showing the Gaussian profile of a laser beam 802 and the two slices 806 and 808 taken with photodiode sensors shown in FIG. 22.

FIG. 23 is a three dimensional graph showing the Gaussian profile of a laser beam 802 and the two slices 2206 and 2208 taken with photodiode sensors shown in FIG. 22. As indicated with respect to FIG. 22, as more and more slices such as 2206 and 2208 of the Gaussian are obtained, the full Gaussian 2202 can be determined with higher accuracy. The three-dimensional full Gaussian profile 2202 is similar to the Gaussian profile shown in three dimension in FIG. 21, with the vertical and horizontal axis having the same measurement scale. The beam of the full Gaussian 2202 in FIG. 23 is only shown as a circle in two dimensions in FIG. 22 for illustration purposes. The slices 2206 and 2208 shown as a line in two dimensions in FIG. 22 form slice planes in FIG. 23 that cut through a portion of the full three dimensional Gaussian profile 2202 in FIG. 23.

Figure 24:
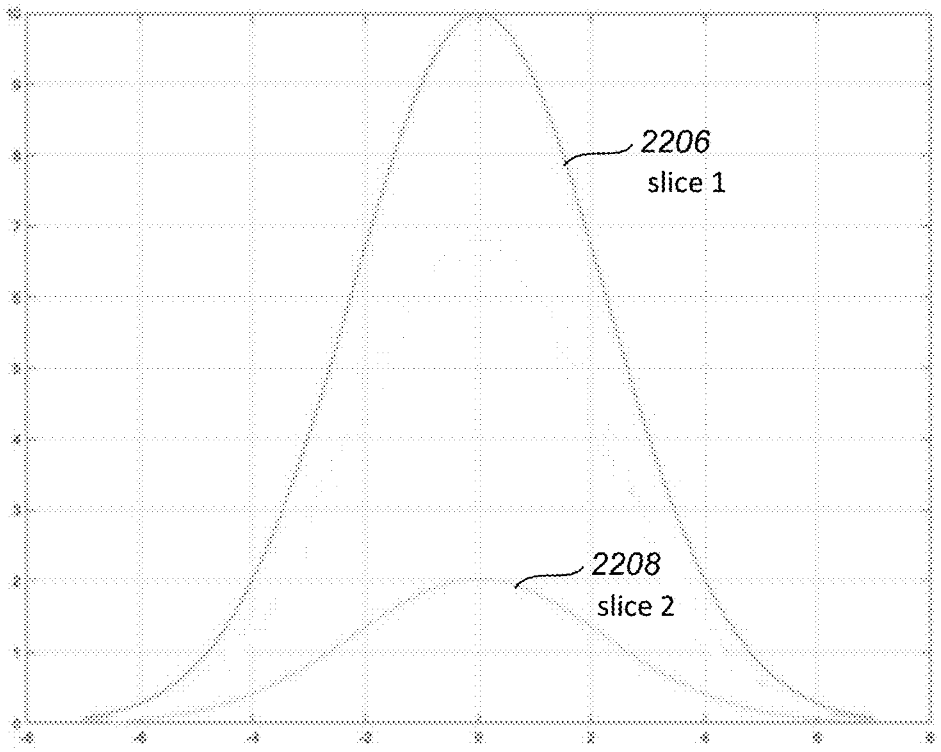
FIG. 24 is a two-dimensional graph illustrating the power level measurement of the two slices 806 and 808 that are shown in the three-dimensional graph in FIG. 23.

FIG. 24 is a two-dimensional graph illustrating the power level measurement of the two slices 806 and 808 that are shown in the three-dimensional graph in FIG. 23. Measurement of the irradiance power level in two-dimensions for each slice can be used along with multiple additional slices to obtain the full Gaussian profile in three-dimensions. The x-axis scale in FIG. 24 shows distance in meters from the peak of the Gaussian to the slice with 0 being at the center. The y-axis scale shows irradiance power level in Watts/meter$^2$. Because of the location that the slice cuts through the Gaussian profile 2202, a slice cut closer to the peak has a greater amplitude than a slice taken farther from the peak. The slice 1 2206 is closer to the Gaussian peak than slice 2 2208 as shown in FIG. 24. Since the slices are not taken at the peak, information is needed on the location of the slice taken relative to the Gaussian peak which will be described with respect to subsequent drawings.

Figure 25:
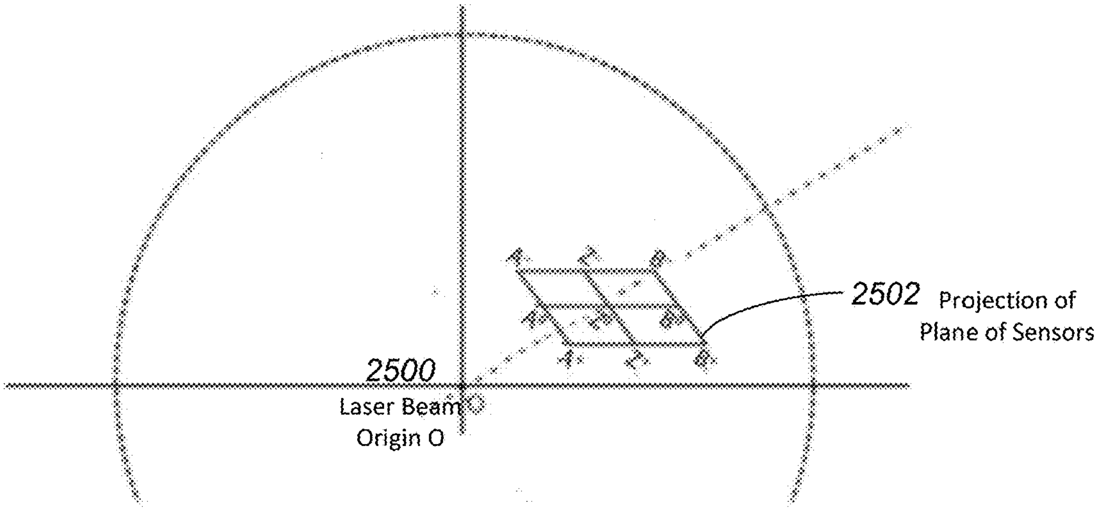
FIG. 25 shows a graph of the origin of the laser beam and central axis of the laser beam relative to the normalized reference plane of sensors.

FIG. 25 shows a graph of the origin of the laser beam 2500 and central axis of the laser beam relative to the normalized reference plane of sensors 2502. FIG. 25 is used to illustrate mathematical transforms that can be applied to rotate the reference plane and normalize the plane of sensor positions due to radial symmetry. The rotation can be done by using radial coordinates or cartesian coordinates to facilitate computation. Because of the symmetry, the rotation of the reference axis can be made to align segments $A^-Z^-B^-$, $A^0Z^0B^0$ and $A^+Z^+B^+$ to be parallel to the x-axis. The segments $A^-A^0A^+$, $Z^-Z^0Z^+$ and $B^-B^0B^+$ are parallel to each other.

Figure 26:
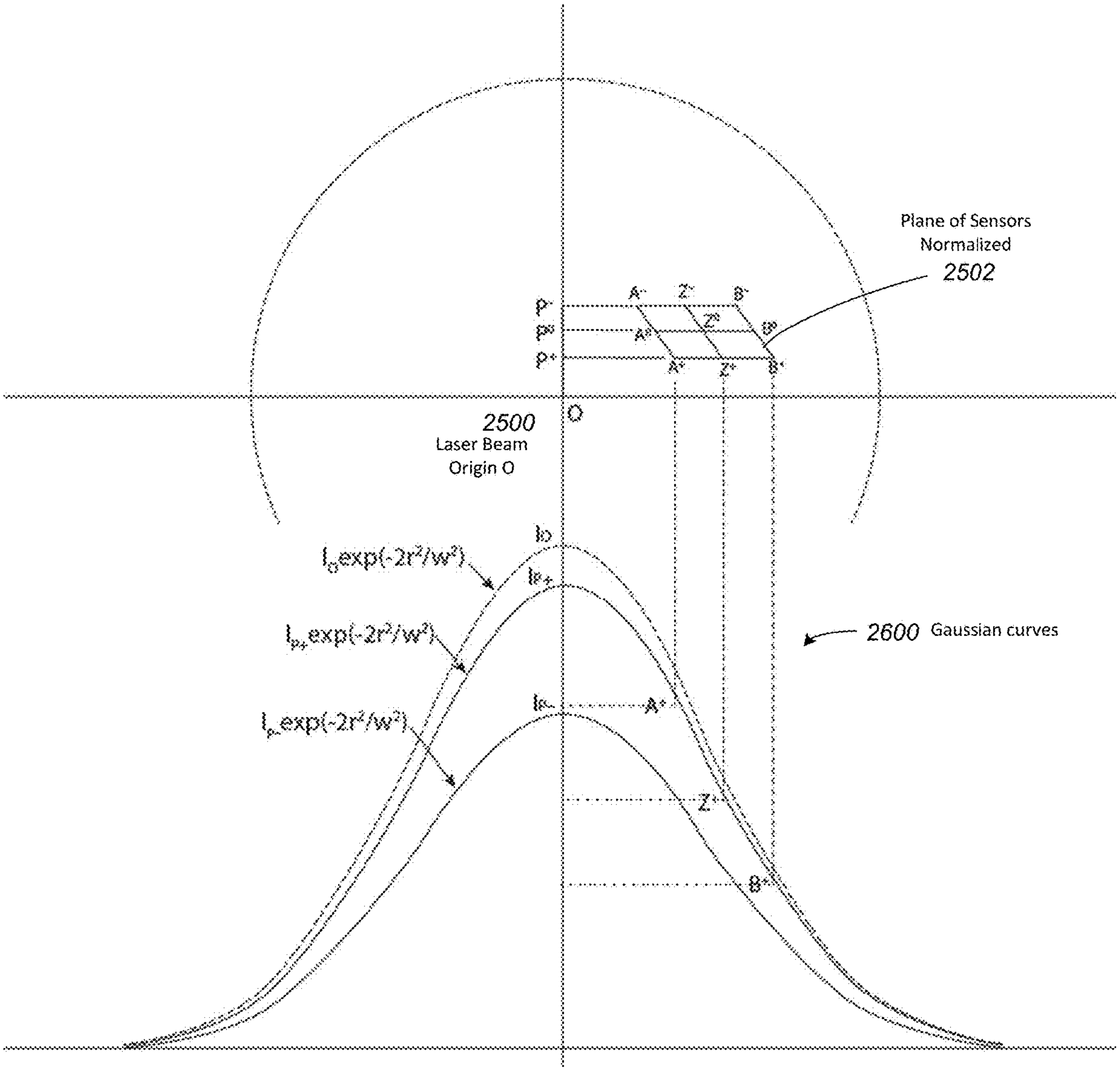
FIG. 26 shows a graph with points from the laser origin O 1400 and from the normalized planes of sensors 1302 of FIG. 25 projected onto Gaussian curves to provide for a determination of a Gaussian profile using a Gaussian profile algorithm.

FIG. 26 shows a graph with points from the laser origin O 2500 and from the normalized planes of sensors 2502 of FIG. 25 projected onto Gaussian curves to provide for a determination of a Gaussian profile using a Gaussian profile algorithm. FIG. 26 is used to illustrate how power detector photodiode sensor data with an offset angle can be normalized or converted to data without such an offset angle. To use the offset angle to normalize the slice data, in accordance with embodiments the following calculations are made to convert the photodiode sensor data from the photodiode sensors of the photodiode irradiance power detectors 102 of FIG. 1. First, reference is made to the Gaussian irradiance profile for Io, $I_{P+}$ and $I_{P-}$ that are shown subsequently expressed in radial coordinates provided previously herein as follows:

$$I = I_0 \exp\left[-2r^2/w^2\right]$$

This irradiance can be expressed in cartesian coordinates as indicated previously herein as follows:

$$I(x, y) = I_o e^{-2\frac{(x-\mu_x)^2+(y-\mu_y)^2}{w^2}}$$

Using these equations, the following demonstrates the key concept of using the Gaussian profile algorithm for a fast Gaussian profile characterization based on taking slices of the Gaussian along lines of the plane of sensors and normalizing the plane when there is an offset. The irradiance profile Iz can be determined from a slice along PZ which is cut from Gaussian profile from segment PZ as follows:

$$I_Z(r) = I_P e^{-2\frac{(r-\mu_P)^2}{w^2}}$$

Note that slice PZ can be made from $P^+Z^+$ and $P^-Z^-$ to determine values for $I_Z-$ and $I_Z+$ that are provided on Gaussian profile curves 2600.

For the algorithm, Z is first set to zero. A length s is defined as the length of segment AZ and ZB. For PZ, given the values (−s, $I_A$), (0, $I_Z$), (s, $I_B$), the algorithm finds Ip and wp and $\mu_P$=PZ. For a slice along $P^+Z^+$, the algorithm finds $I_{P+}$, $w_{P+}$ and $\mu_{P+}=P^+Z^+$. For a slice along $P^-Z^-$, the algorithm finds $I_{P-}$, $w_{P-}$ and $\mu_{P-}=P^-Z^-$.

Next for a slice OP, the algorithm uses the following equations:

$$I_P = I_o e^{-2\frac{OP^2}{w^2}}$$

and $$OP^- = OP^+ + P^+P^-$$

Then given w, $I_{P+}$, $I_{P-}$, and $P^+P^-$ the algorithm finds $OP^+$, $OP^-$ and $I_0$.

Figure 27:
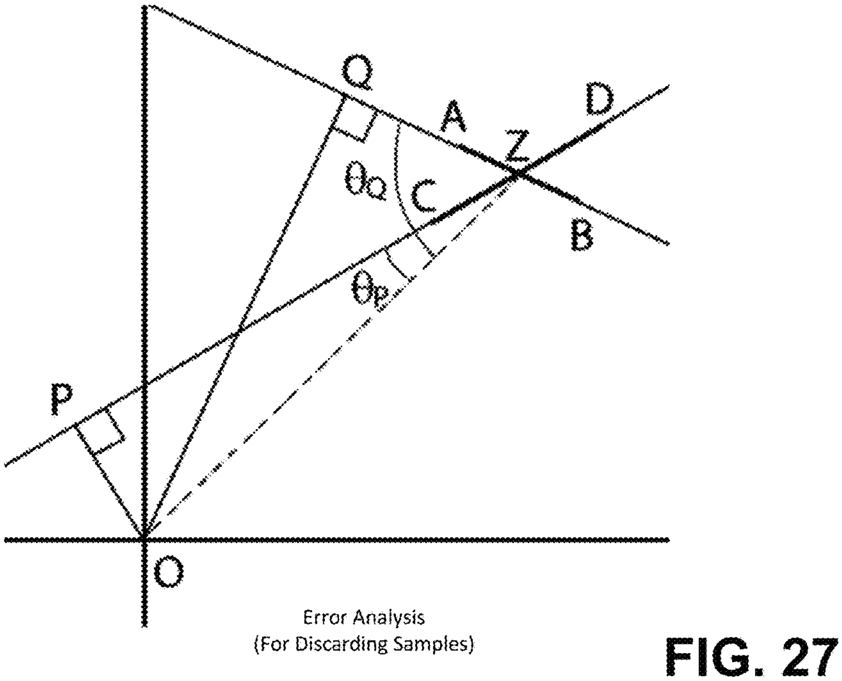
FIG. 27 provides a graph to illustrate how individual normalized measurement points from the calculations above made with respect to FIG. 26 can be evaluated to determine measurement accuracy, enabling inaccurate sensor measurements to be discarded.

FIG. 27 provides a graph to illustrate how individual normalized measurement points from the calculations above made with respect to FIG. 26 can be evaluated to determine measurement accuracy, enabling inaccurate sensor measurements to be discarded. Based on criteria determined using FIG. 27, measurements points outside the desired error accuracy range can be evaluated and discarded when outside an accuracy range. Irradiance measured at point Z in FIG. 16 can be expressed using the following three Gaussian equations:

$$I_Z = I_O e^{-2\frac{OZ^2}{w^2}} = I_Q e^{-2\frac{QZ^2}{w^2}} = I_P e^{-2\frac{PZ^2}{w^2}}$$

Also, the following equations are used in determining measurement accuracy:

$$I_Q = I_O e^{-2\frac{OQ^2}{w^2}}$$

$$I_P = I_O e^{-2\frac{OP^2}{w^2}}$$

$$\frac{w^2}{2}\ln\frac{I_Z}{I_O} = OZ^2 = OQ^2 + QZ^2 = OP^2 + PZ^2$$

These equations can be represented using two right triangles sharing a hypotenuse as shown in FIG. 27.

Determining samples to reject, is performed with use of the graph of FIG. 27. A sample is rejected based on the following conditions. First, if an insufficient gradient is found among the irradiance sample points $I_A$, $I_B$, $I_C$, $I_D$, and $I_Z$. Second, if estimates of w from the samples in planes AZD and CZB do not agree. Third, if estimates of $I_O$ from the samples in planes AZD and CZB do not agree. Finally, if the beam radius, w, is too small (<4 cm) or too large (>4 m).

D. Characterization of Laser Source Using Other Measurements

Further measurements in addition to total laser power can be determined using the power detection system with embodiments described herein. The measurement of peak irradiation power Io at the laser beam central peak can be determined using both the photodiode irradiance power detectors 102 and diffraction grating with sensors 104 of FIG. 1. Such peak irradiation power Io enables determination if an individual could have been exposed to the maximum permissible exposure (MPE) of the laser. Further measurements include wavelength of the laser source laser beam provided from the diffraction grating with sensors 104, and beam propagation information from use of the photodiode irradiance power detectors 102, all enabling the laser source to be identified. Such identification of the laser source can enable authorities to identify a manufacturer that can be used to locate the person who is currently using the laser source.

Figure 28:
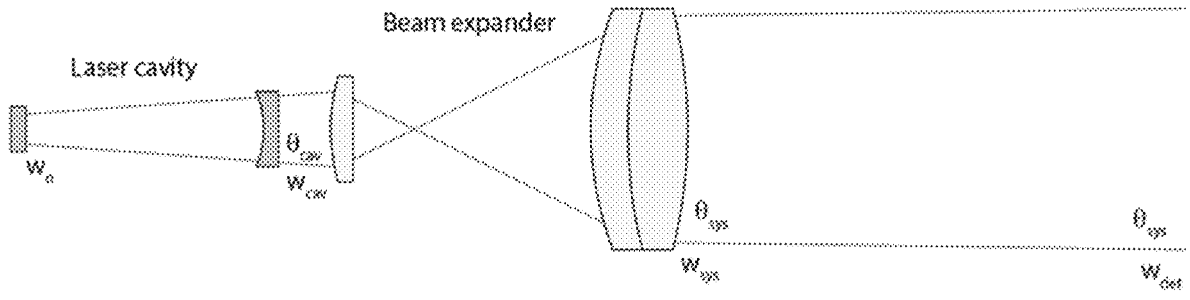
FIG. 28 shows components of a laser source cavity along with a beam expander to illustrate calculation of parameters of the laser beam propagation including beam divergence and beam expander magnification power (MP).

FIG. 28 shows components of a laser source cavity along with a beam expander to illustrate calculation of parameters of the laser beam propagation including beam divergence and beam expander magnification power (MP). Further characterizing information of the laser source to enable identification of the laser source type and manufacturer that can be determined from the Gaussian profile and laser source position include the beam divergence and magnification power (MP). Beam divergence is an angular measure of the increase in beam diameter or radius with distance from the optical aperture or antenna aperture from which the beam emerges. A beam expander provides magnification lenses to make it possible to reduce the diameter of the beam at maximum range. The photodiode irradiance power detectors 102 of FIG. 1 provide determination of the beam diameter which along with beam position information provided from the diffraction grating with sensors 104 of FIG. 1 to enable measurement of such parameters.

Based on the information on the wavelength beam radius and distance to the laser provided by the photodiode sensors of the photodiode irradiance power detectors 102 of FIG. 1, the magnification power of the source optics can be calculated based on assumptions of the beam waist. This provides general information on the level of sophistication of the laser source. The laser beam begins with a width $w_0$. After passing through the lens of the laser cavity, the width increases to $w_{cav}$ and the beam has a divergence angle $\theta_{cav}$. After passing through the beam expander lens system, the beam width increases to $w_{sys}$. and the divergence angle increases to $\theta_{sys}$. At the power detector, the beam width is $w_{det}$.

From the parameters shown in FIG. 28, the beam divergence and magnification power (MP) can be calculated. The half beam divergence is expressed as follows:

$$\theta = \frac{\lambda_o}{\pi w_o}$$

Further the MP can be expressed as follows:

$$MP = \frac{\theta_{cav}}{\theta_{sys}}$$

For a large z, or distance from the photodiode sensors to the laser source, meaning $w \approx \theta_{sys} z$, MP can be expressed as follows:

$$MP = \frac{z\lambda_o}{\pi w w_o}$$

Figure 29:
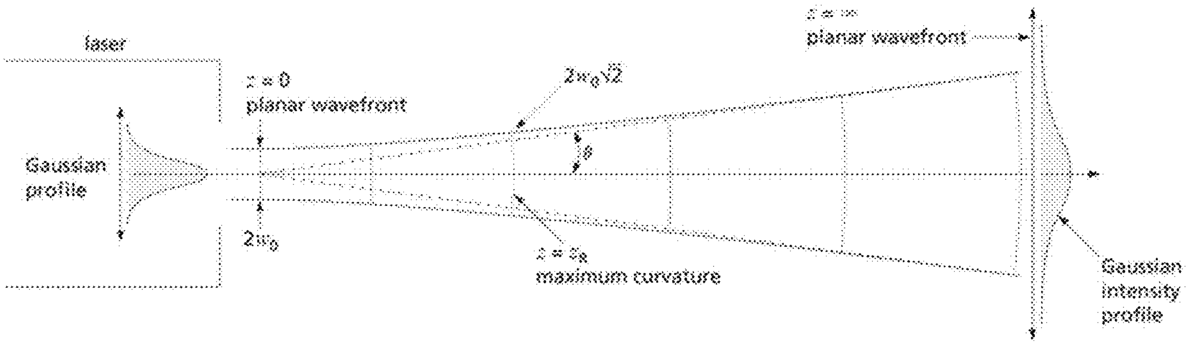
FIG. 29 illustrates a Gaussian beam propagation with measurement of irradiance and laser source distance further enabling determination of beam propagation information to identify the laser source, including beam divergence and Rayleigh range including when a beam expander is used.

FIG. 29 illustrates a Gaussian beam propagation with measurement of irradiance and laser source distance further enabling determination of beam propagation information to identify the laser source, including beam divergence and Rayleigh range including when a beam expander is used. The data for determining the beam divergence and Rayleigh range is obtained from the photodiodes of the photodiode irradiance power detectors 102 of FIG. 1. In FIG. 29, the laser source provides the Gaussian profile shown that is detected with the photodiodes. At the laser source, or a distance of z=0, the planar wavefront has a beam width $2w_0$. At a distance $z=z_R$ which is expressed as the Rayleigh length, the beam width increases to $2w_0\sqrt{2}$. Finally at the detector, the distance from the laser source is illustrated as $z=\infty$. The planar front of the Gaussian profile, thus, extends from the laser source to the planer wavefront where the Gaussian intensity profile is measured. The maximum curvature of the beam occurs at distance from the laser source $Z=z_R$ which is the Rayleigh length. The parameters provide for evaluation of waist size as a function of distance $w^2(z)$. The equation for waist size as a function of distance is as follows:

$$w^2(z) = w_o^2\left[1 + \frac{\lambda_o z}{\pi w_o^2}\right] = w_o^2\left[1 + \left(\frac{z}{z_R}\right)^2\right]$$

Beyond the Rayleigh range, which will be the case for virtually all laser hits, the equations describe the waist size and half beam divergence. At long distances, the beam front is assumed to be planar. The Rayleigh length can then be expressed as follows:

$$z_R = \frac{\pi w_o^2}{\lambda_o}$$

The beam divergence is then typically expressed as:

$$\frac{\theta}{2} = \frac{\lambda_o}{\pi w_o}$$

Based on the measured irradiance profile and laser distance and an estimate of wo, the data can be fit with these equations to obtain beam divergence and an estimate of the aperture of the laser optics (e.g. beam expander) can then be characterized.

With above information, the following set of equations describe the Gaussian beam propagation, including the expression for the field and radius of curvature of the wavefront.

$$\frac{E(x, y, z)}{E_o} = \frac{w_o}{w(z)}\exp\left[-\frac{r^2}{w^2(z)}\right]\exp\left\{-j\left[kz - \tan^{-1}\left(\frac{z}{z_o}\right)\right]\right\}\exp\left[-j\frac{kr^2}{2R(z)}\right]$$

$$R(z) = z\left[1 + \left(\frac{\pi n w_o^{\eta}}{\lambda_o z}\right)^2\right] = z\left[1 + \left(\frac{z_R}{z}\right)^2\right]$$

Magnifying power (MP) can be related to beam divergence. The smaller the waist radius the larger the beam divergence. With this in mind, the following equations can be used to better determine MP. First, the product of the waist radius and beam divergence can be assumed to be constant as shown below.

$$\frac{\theta}{2} = \frac{\lambda_o}{\pi w_o} \rightarrow \theta \cdot w_o = const$$

Advanced laser systems (e.g. laser designators) expand the output beam diameter to reduce divergence. A beam expander increases input laser beam diameter by the expansion power while decreasing the divergence by the same expansion power. A laser beam expander is designed to increase the diameter D of a collimated input beam to a larger collimated output beam. The value of MP can thus be expressed as follows:

$$MP = \frac{\theta_I}{\theta_O} = \frac{D_O}{D_I}$$

Magnifying power is the ratio of input to output divergence which is equal to output to input beam diameters. The beam diameters can be related as follows.

$$D_O = D_I + z\ \tan\theta_I = MP \cdot D_I + z\ \tan\frac{\theta_I}{MP} = MP \cdot D_I + z\ \tan\ \theta_I$$

Given $D_0$ (Gaussian sensor), z (main sensor), and $\theta_1$ (typical DPSS laser parameter), MP can be characterized and thus the size of the laser system aperture determined. This will provide information on the level of sophistication of the laser source, and in particular, if the source is a laser designator.

The power detection system described can further provide an indication if a detected light source is a laser or a non-laser. A non-laser source can be detected if multiple samples provided from the photodiode sensors of the photodiode irradiance power detectors 102 of FIG. 1 indicate that the laser profile is not Gaussian. The output of the diffraction grating with sensors 104 of FIG. 1 can be applied through convolution kernels to further determine wavelength detected, and because a laser is single wavelength, broad wavelength spectra received and detected from the photodiodes are an indication that the source is a non-laser. The photodiode sensors can further detect a non-laser by determining pulse rate and pulse width of light received. A technique of obtaining temporal resolution of the laser, for example to detect pulse rate, is to rotate the dual-axis diffraction grating. The resulting diffraction pattern obtained from such rotation with image exposure time longer than the pulse rate provides a series of arcs that corresponds to the laser pulse rate. Although the photodiode sensors of the photodiode irradiance power detectors 102 of FIG. 1 can be used to detect pulse rate and pulse width, separate pulse sensors 105 as shown in FIG. 1 can be used for rapid pulse detection to determine if light received is from a laser to enable elimination of non-laser light from measurement considerations.

E. Overview of Embodiments

1. Laser Detector Characterization Based on Wavelength

Embodiments of the laser detector include systems and methods for characterizing the laser. In a first set of embodiments, characterization of the laser source involves determining wavelength and irradiance of the laser source. The laser detector embodiments for characterizing the laser source based on wavelength are summarized as follows.

Embodiments of the laser detector described herein provide a system and method for characterizing a laser using a diffraction grating to determine wavelength and irradiance. The system includes a lens that projects diffraction patterns from the diffraction grating as an image of diffraction peaks onto a plane. Optical sensors then sense the diffraction peaks. A processor connected to the optical sensors applies the laser characterization method to determine the laser wavelength and irradiance. In the method, the processor obtains the diffraction peak measurements from the optical sensors and applies a transform to arrange the diffraction peaks into a grid of regularly spaced peaks. The processor then applies convolution kernels to analyze the grid of regularized peaks to determine a wavelength and irradiance of the laser.

In certain embodiments, the grid of regularized peaks comprises a square grid of peaks. Applying the convolution kernels to analyze the grid of regularized peaks then comprises determining a distance between peaks of the square grid of peaks. The distance between peaks is used to determine a wavelength of the laser beam. Information the amplitude of the peaks are used to determine the laser irradiance.

In certain embodiments, the grid of regularized peaks comprises a distinct pattern of peaks that is analyzed by the convolution kernels to determine the wavelength and irradiance by spatially filtering the image and then applying a series of two-dimensional Shah functions.

In certain embodiments, the laser wavelength is determined by convolving a series of kernels corresponding to the pitch of the regularized peaks and evaluating a resulting convolved image to determine a kernel that produced a best fit with the grid of regularized peaks.

In certain embodiments, the laser beam is characterized by performing analysis on progressively higher resolution images and using convolution kernels optimized for each of the sequences of images. Initially ones of the convolution kernels are used to determine if initial ones of the grids have a pattern of regularized peaks that are of high enough resolution to identify the laser. Then subsequent ones of the convolution kernels are used to determine a higher resolution distance between peaks of the grids of regularized peaks to identify the wavelength for the laser.

In certain embodiments, the array of diffraction peaks includes distinct patterns with varying pitches when multiple lasers are present corresponding to a specific wavelengths corresponding to the multiple lasers that is detectable by the convolution kernels. The convolution kernel then determines the wavelength of the laser beam as well as a wavelength of additional ones of the multiple lasers within the specific wavelengths.

In certain embodiments, the image is processed to highlight patterns of the regularly spaced diffraction peaks characteristic of a laser and to suppress regions from a nonlaser source which do not have narrow diffraction peaks.

In certain embodiments, the array of diffraction peaks is a two dimensional array of diffraction peaks that are converted to horizontal and vertical one-dimensional signals. The convolution kernels in these embodiments process the signals resulting from at least one of the horizontal and vertical one-dimensional signals to determine spacing between peaks to identify wavelength. In some of these embodiments, the horizontal one dimensional signals constitute row signals and the vertical one dimensional signals constitute column signals, and the convolution kernel processes the row signals and column signals by using a summation of the intensities.

In certain embodiments the optical lens of the system is an orthographic projection lens that follows the sine law that natively generates diffraction peaks in a square grid. In further embodiments, the optical lens comprises a first optical lens group as well as a second optical lens group, wherein the diffraction grating is placed between the first optical and second optical lens groups forming a lens assembly.

In certain embodiments, the optical sensors of the system include secondary sensors and primary sensors. The secondary sensors are used for screening signals received from the optical sensors to identify the laser beam relative to non-lasers. The primary sensors have higher power consumption and higher resolution than the secondary sensors and uses convolution kernels to determine the wavelength of the laser beam.

In certain embodiments, the diffraction grating of the system comprises a combination of two or more linear diffraction gratings placed at specific angles with respect to each other. In one embodiment the two or more linear diffraction gratings comprise two diffraction gratings and the specific angles are 90 degrees with respect to each other. In an alternative embodiment, the two or more linear diffraction gratings comprise three diffraction gratings and the specific angles are 60 degrees with respect to each other. Alternatively, the diffraction grating can be a single optical element in which the grating pattern is designed to produce a specific diffraction pattern.

2. Laser Position Detector

Embodiments of the laser detector include systems and methods for determining the location of a laser source. The laser position detector embodiments are summarized as follows.

Embodiments described herein provide a system and method for determining the location of a laser source. The system uses a diffraction grating that receives the laser beam strike to determine the location. Optical sensors sense an array of diffraction peaks from the image output from the diffraction grating. A processor connected to the optical sensors is configured to obtain the diffraction peaks from the laser beam strike and apply a transform to arrange the diffraction peaks into a grid of regularized peaks. A convolution kernel is then applied by the processor to determine a position of the zeroth order diffraction central peak in the grid of regularized peaks. The position of the central peak is then used to calculate the angle of incidence of the axis of the laser beam to determine the location of the laser.

Certain embodiments of a system for determining location of the laser further include: a global navigation satellite system (GNSS) and inertial navigation system (INS) position system sensors; a ground terrain map resource; and a tilt, pan and roll angle indicator that indicates a tilt, pan and roll angles of a plane containing the optical sensors of the laser detector. The processor uses the diffraction grating to determine the angle of incidence of the laser beam relative to laser detector. The processor further uses the tilt, pan and roll angles of optical sensors relative to reference coordinates including: offset axis of the plane containing the optical sensors relative to a plane perpendicular to the central axis of the laser beam; and orientation of the vehicle the laser detector is attached to, so as to make a determination of a look angle of the laser detector. A location and orientation of the laser detector is further determined using the GNSS-INS position system sensors. Location of the laser source based on terrain information is obtained from the ground map resource.

In certain embodiments, the processor is configured to make measurements even when some of the image sensors are in saturation. In these embodiments, when saturation of a region of the image sensors is detected, the position of the central peak is determined based on irradiance measured from ones of the image sensors providing the array of diffraction peaks that are outside of the saturation region.

In certain embodiments when saturation is detected, the processor determines the central zeroth order peak position by adding the columns and rows of the partially saturated diffraction image, where the central peak is determined by the sum of saturated region and unsaturated regions contained in the rows or columns. The saturation region provides a broad bump, while unsaturated diffraction peaks provide sharper peaks in a one dimensional pattern provided from the rows and columns.

Certain embodiments provide for detection of multiple laser sources operating at different wavelengths. In such embodiments, a convolution kernel is used to identify the separate laser sources based on different wavelengths determined from the grid of regularized peaks. The convolution kernels then determine a position of the zeroth order diffraction central peak in the grid of regularized peaks for each separate laser. The position of the central peak for each laser source is then used to calculate the angle of incidence of the axis of the respective laser source to enable determination of the location of each laser.

3. Laser Characterization Based on Power Level and Other Factors

Embodiments of the laser detector include systems and methods for characterization of a laser based on the irradiance power level as well as other features of the laser source. The laser detector embodiments that characterize a laser source based on irradiance power level as well as other features are summarized as follows.

Embodiments described herein provide a system and method for determining total power and maximum irradiance for a laser source. The method first measures an irradiation profile from a beam strike of the laser by taking multiple spatial samples of the laser beam strike to identify linear offset Gaussian slices used to solve for a Gaussian of the irradiation profile. Next, the method solves the Gaussian of the irradiation profile to obtain a Gaussian profile of the beam, where solving to obtain the Gaussian profile includes the following steps: measuring an angle of incidence of a central axis of the laser beam relative to a normal axis of a plane containing the multiple spatial samples; measuring a positional offset of the plane containing the multiple spatial samples relative to a plane perpendicular to the central axis of the laser beam; creating a projection of the plane containing the multiple spatial samples onto the plane perpendicular to a propagation of the beam for the Gaussian profile using the positional offset to provide centered linear slices; and constructing the Gaussian profile from the centered linear slices using the angle of incidence. Total laser power is then determined by taking an integral of the centered Gaussian profile.

Certain embodiments are provided for the step of measuring the angle of incidence which is done by obtaining an array of diffraction spectral peaks from photodiodes exposed to the laser beam strike. A transform is applied to arrange the diffraction spectral peaks into a square grid of regularized peaks. Convolution kernels are then used to determine the position of a central peak of the square grid of regularized peaks. The angle of incidence of the axis of the laser beam is then calculated using a position of the central peak.

In the method embodiments, the multiple spatial samples are measurements of irradiance, I, used to calculate the Gaussian profile wherein the irradiance is $I=I_0\exp[-2r^2/w^2]$. The value I is then the beam irradiance measured at a point on the Gaussian profile determined using one of the spatial samples. The value Io is the peak beam irradiance which is an irradiance I at the center of the beam. The value w is the beam radius which is a distance from the center of the beam to a position where power is reduced to $1/e^2$. The value r is a distance from a center of the Gaussian to a measurement point. Irradiance I can then be used to determine the total power P of the laser beam.

In embodiments, the values for Io, w and r are determined for one of the linear offset Gaussian slices obtained from a pair of the photodiodes providing the spatial samples. In some embodiments, iterations are provided to refine the Gaussian profile by using additional pairs of the photodiodes providing spatial samples to provide additional linear offset Gaussian slices to determine the Gaussian profile. The peak irradiation power Io, or the highest value determined for Io is used to determine if a pilot or other individual could have been exposed to maximum permissible exposure (MPE) of the laser.

Certain embodiments identify beams which are non-Gaussian and thus not diffraction limited. In an embodiment, multiple spatial samples are taken as the detector and laser are in relative motion such that the angle of incidence and the beam offset change from sample to sample. The changes in the vantage point of the laser provides sampling of the laser beam a various positions allowing a more robust characterization of its profile. In another embodiment, non-lasers are detected by determining if multiple wavelengths are obtained from the multiple spatial samples. In another embodiment, non-lasers are detected by determining if the spatial samples are sensing light from a non-laser by determining pulse rate and pulse width of light from the multiple spatial samples.

Further embodiments provide an apparatus for determining total laser power. The apparatus includes photodiode sensors arranged in a plane and configured to take multiple spatial samples of an irradiation profile from a beam strike of the laser to identify linear offset Gaussian slices used to solve for a Gaussian of the irradiation profile. The apparatus further includes a processor connected to the photodiode sensors, with the processor configured to perform the following steps: measure an angle of incidence of a central axis of the laser beam relative to a normal axis of the plane with the multiple spatial samples; measure a positional offset of a plane of the photodiode sensors relative to a plane perpendicular to the central axis of the laser beam; create a projection of the plane containing the multiple spatial samples onto the plane perpendicular to a propagation of the beam for the Gaussian profile using the positional offset creating centered linear slices; construct the Gaussian profile from the centered linear slices using the angle of incidence; and then determine the total laser power from the Gaussian profile.

In certain embodiments to measure the angle of incidence of the axis of the laser beam, the apparatus further includes a diffraction grating with sensors configured to provide an array of diffraction spectral peaks from the beam strike. The processor is connected to the diffraction grating with sensors and is further configured to measure the angle of incidence by: applying a transform to arrange the diffraction spectral peaks into a square grid of regularized peaks; using convolution kernels to determine a position of a central peak in the square grid of regularized peaks; and using a position of the central peak to calculate the angle of incidence of the axis of the laser beam relative to the diffraction grating.

Further embodiments provide a non-transitory computer readable medium comprising stored instructions which when executed by a processor cause the processor to perform certain steps. The steps first include measuring an irradiation profile from a beam strike of the laser by taking multiple spatial samples of the laser beam strike to identify linear offset Gaussian slices used to solve for a Gaussian of the irradiation profile. The steps additionally include solving the Gaussian of the irradiation profile to obtain a Gaussian profile of the beam, wherein solving to obtain the Gaussian profile includes steps to: measure an angle of incidence of a central axis of the laser beam relative to a normal axis of a plane containing the multiple spatial samples; measure a positional axis of the plane containing the multiple spatial samples relative to a plane perpendicular to the central axis of the laser beam; create a projection of the plane containing the multiple spatial samples onto the plane perpendicular to a propagation of the beam for the Gaussian profile using the positional offset to provide centered linear slices; and construct the Gaussian profile from the centered linear slices using the angle of incidence; and determine the total laser power from the Gaussian profile.

The subject matter described herein may be embodied in systems, apparatus, methods, and/or articles depending on the desired configuration. In particular, various implementations of the subject matter described herein may be realized in computer software, firmware or hardware and/or combinations thereof, as well as in digital electronic circuitry, integrated circuitry, and the like. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications, applications, components, or code) include machine instructions for a programmable processor and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs), but not limited thereto) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, certain the subject matter described herein may be implemented on a computer having a display device (e.g., a touch-sensitive display, a non-touch sensitive display monitor, but not limited thereto) for displaying information to the user and a keyboard, touch screen and/or a pointing device (e.g., a mouse, touchpad or a trackball, but not limited thereto) by which the user may provide input to the computer. Other kinds of devices may be used to provide for interaction with a user, administrator and/or manager as well; for example, feedback provided to the user, administrator and/or manager may be any form of sensory feedback (e.g., visual feedback, auditory feedback, or tactile feedback); and input from the user may be received in any form, including acoustic, speech, or tactile input, depending upon implementation.

The subject matter described herein may be implemented in a computing system that includes a back-end component (e.g., as a data server), or that includes a middleware component (e.g., an application server), or that includes a front-end component (e.g., a client computer having a graphical user interface (GUI) or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include, but are not limited to, a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Wherever possible, the same reference numbers will be used throughout the drawings to refer to the same or like parts.

While various embodiments of the present technology have been described above, it should be understood that they have been presented by way of example, and not limitation. It will be apparent to persons skilled in the relevant art that various changes in form and detail can be made therein without departing from the spirit and scope of the technology. For example, although a few variations have been described in detail above, other modifications or additions are possible. In particular, further features and/or variations may be provided in addition to those set forth herein. For example, the implementations described above may be directed to various combinations and sub-combinations of the disclosed features and/or combinations and sub-combinations of several further features disclosed above. In addition, the logic flow depicted in the accompanying figures and/or described herein do not require the particular order shown, or sequential order, to achieve desirable results. Other embodiments may be within the scope of the following claims.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. One skilled in the art will recognize that these functional building blocks can be implemented by discrete components, application specific integrated circuits, processors executing appropriate software and the like or any combination thereof.

The breadth and scope of the present technology should not be limited by any of the above-described exemplary embodiments but should be defined only in accordance with the following claims and their equivalents.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for characterizing a laser comprising:

obtaining an array of diffraction peaks from a laser beam strike on a diffraction grating;

using an optical lens to project the array of diffraction peaks as an image;

sensing the diffraction peaks from the image by optical sensors;

applying a transform to the image to arrange the diffraction peaks into a grid of regularly spaced peaks;

performing a cross-correlation of a plurality of convolution kernels with the grid of regularly spaced peaks, each of the plurality of convolution kernels having a different pitch;

analyzing the cross-correlation of the plurality of the convolution kernels to determine a wavelength of the laser beam; and analyzing the cross-correlation of the plurality of the convolution kernels to determine the irradiance of the laser beam from intensity profiles of the grid of regularly spaced peak.

2. The method of claim 1, wherein:

the grid of regularly spaced peaks comprises a square grid of peaks;

analyzing the cross-correlation of the plurality of the convolution kernels to determine the irradiance of the laser beam comprises determining a distance between peaks of the square grid of peaks wherein the distance between peaks is used to determine the wavelength of the laser beam; and analyzing the cross-correlation of the plurality of the convolution kernels to determine the irradiance of the laser beam comprises determining an intensity profile of the square grid of peaks wherein the intensity profile of the peaks is used to determine the irradiance of the laser.

3. The method of claim 1, wherein the grid of regularized peaks comprises a distinct pattern of peaks that is analyzed by the convolution kernels to determine the wavelength by spatially filtering the image then applying a series of two-dimensional Shah fuctions.

4. The method of claim 1, wherein:

the laser wavelength is determined by convolving a series of kernels corresponding to a pitch of the regularized peaks and evaluating a resulting convolved image to determine a kernel that produced a best fit with the grid of regularized peaks.

5. The method of claim 1, wherein the optical sensors comprise primary sensors and secondary sensors, wherein the primary sensors have a higher signal reception resolution than the secondary sensors, wherein the laser beam is characterized by performing analysis on a sequence of progressively higher resolution images starting with screening signals detected by the secondary sensors, and using convolution kernels optimized for each of the sequences of images, using initial ones of the convolution kernels to determine if initial ones of the grids have a pattern of regularized peaks that are of high enough resolution to identify the laser and using subsequent ones of the convolution kernels to determine a higher resolution distance between peaks of the grids of regularized peaks to identify the wavelength for the laser.

6. The method of claim 1, wherein:

the array of diffraction peaks include distinct patterns with varying pitches when multiple lasers are present corresponding to a specific wavelengths corresponding to the multiple lasers that is detectable by the convolution kernels, the convolution kernel determines the wavelength of the laser beam as well as a wavelength of additional ones of the multiple lasers within the specific wavelengths, and the convolution kernel further determines the irradiance for each wavelength from the intensity profile of the peaks corresponding to each wavelength.

7. The method of claim 1, including image based processing that comprises:

processing the image to highlight patterns of the regularly spaced diffraction peaks characteristic of a laser and to suppress regions from a non laser source which do not have well defined diffraction peaks.

8. The method of claim 1, wherein for situations where centrally located ones of the diffraction peaks are saturated:

the wavelength is computed by obtaining a pitch of higher order ones of the diffraction peaks that are not saturated, and the intensity profiles for the saturated centrally located peaks are computed from a measurement of peripheral ones of the diffraction peaks and by applying diffraction theory that defines an envelope for the diffraction peaks.

9. The method of claim 1, wherein when saturation of regions of the diffraction peaks is detected:

the convolution kernels are optimized to determine ones of the intensity profiles of the diffraction peaks in an unsaturated region of the image plane and to obtain an estimate of ones of the intensity profiles of the diffraction peaks in the saturated region based on the unsaturated ones of the diffraction peaks, and the intensity profiles are used to compute the irradiance of the laser.

10. The method of claim 1, wherein:

the array of diffraction peaks is a two dimensional array of diffraction peaks that are converted to horizontal and vertical one-dimensional signals; and the convolution kernel processes the signals resulting from at least one of the horizontal and vertical one-dimensional signals to determine spacing between peaks to identify wavelength and amplitudes of the peaks to determine the irradiance.

11. The method of claim 10, wherein the laser is characterized by regularly spaced peaks in at least one of the one dimensional signals and the expected intensities of the peaks of the orders of the diffraction.

12. The method of claim 10, wherein the convolution kernel identifies peaks that match the expected pitch and intensities of the diffraction peaks created by the laser.

13. The method of claim 10, wherein:

the horizontal one dimensional signals constitute row signals and the vertical one dimensional signals constitute column signals; and the convolution kernel processes the row signals and column signals to determine spacing between peaks by using a summation of the intensities in the rectilinearized diffraction image.

14. An apparatus for characterizing a laser comprising:

a diffraction grating for receiving a laser beam strike;

a lens that projects diffraction patterns from the diffraction grating as an image of diffraction peaks onto a plane;

optical sensors for sensing diffraction peaks from the image output from the diffraction grating resulting from the laser beam strike;

a processor connected to the optical sensors, the processor being configured to:

obtain the array of diffraction peaks from the laser beam strike;

apply a transform to arrange the diffraction peaks into a grid of regularly spaced peaks;

performing a cross-correlation of a plurality of convolution kernels with the grid of regularly spaced peaks, each of the plurality of convolution kernels having a different pitch;

analyzing the cross-correlation of the plurality of the convolution kernels to determine a wavelength of the laser beam; and analyzing the cross-correlation of the plurality of the convolution kernels to determine the irradiance of the detected laser beam from intensity profiles of the grid of regularly spaced peaks.

15. The apparatus of claim 14, wherein the imaging lens is an orthographic projection lens that follows the sine law that natively generates diffraction peaks in a square grid.

16. The apparatus of claim 14, wherein the optical sensors comprise:

secondary sensors for screening signals received from the optical sensors to identify the laser beam relative to non-lasers; and primary sensors with higher power consumption and higher resolution than the secondary sensors for use by the convolution kernels to determine the wavelength of the laser beam.

17. The apparatus of claim 14, wherein the optical lens comprises a first optical lens group as well as a second optical lens group, wherein the diffraction grating is placed between the first and the second optical lens groups forming a lens assembly.

18. The apparatus of claim 14, wherein the diffraction grating comprises an optical element with two dimensional features designed to create specific diffraction patterns.

19. The apparatus of claim 14, wherein the diffraction grating comprises a combination of two or more linear diffraction gratings placed at specific angles with respect to each other.

20. The apparatus of claim 19, wherein the combination of two or more linear diffraction gratings comprise two diffraction gratings and the specific angles are 90 degrees with respect to each other.

21. The apparatus of claim 19, wherein the combination of two or more linear diffraction gratings comprise three diffraction gratings and the specific angles are 60 degrees with respect to each other.

22. The apparatus of claim 14, wherein the diffraction grating is configured to rotate.

* * * * *